(12) United States Patent
Kuntz et al.

(10) Patent No.: US 6,498,657 B1
(45) Date of Patent: Dec. 24, 2002

(54) PROGRAMMABLE DATA EXTRACTOR, DATA ANALYZER, AND PRINTER REPORT GENERATOR

(75) Inventors: Ludwig Otto Helmut Kuntz, Hoechst im Odenwald (DE); Siegfried Ernst Philipp, Am Reechberg R (DE)

(73) Assignee: Prout AG, Darmstadt (DE)

( * ) Notice: Subject to any disclaimer, the term of this patent is extended or adjusted under 35 U.S.C. 154(b) by 0 days.

(21) Appl. No.: 09/270,528

(22) Filed: Mar. 17, 1999

(51) Int. Cl.[7] ............................................... G06F 15/00
(52) U.S. Cl. ....................... 358/1.15; 358/1.1
(58) Field of Search ........................ 358/1.1, 1.6, 1.13, 358/1.15, 1.18, 501, 401, 403, 448; 382/276; 707/500, 516; 708/1, 2, 135, 136; 709/201, 1; 710/20

(56) References Cited

U.S. PATENT DOCUMENTS

| | | | | |
|---|---|---|---|---|
| 5,668,543 A | * | 9/1997 | Jones | 340/994 |
| 5,682,473 A | * | 10/1997 | Carson et al. | 714/38 |
| 5,761,625 A | * | 6/1998 | Honcik et al. | 701/14 |
| 5,937,153 A | * | 8/1999 | Gauthier | 358/1.18 |
| 6,029,144 A | * | 2/2000 | Barrett et al. | 705/30 |

FOREIGN PATENT DOCUMENTS

EP     0 702 289 A1    3/1996

OTHER PUBLICATIONS

"Form Overlay Print System Using Postscript", *IBM Technical Disclosure Bulletin*, vol. 39, No. 02, Feb. 1996, p. 289.

* cited by examiner

Primary Examiner—Gabriel Garcia
(74) Attorney, Agent, or Firm—Foley & Lardner

(57) ABSTRACT

In addition to functioning as a conventional printer, a printer system responds to triggering strings of characters within incoming pages of data by calling upon a meta-command interpreter to execute meta-commands such as "#if . . . #endif," "#for . . . #next," and "#mid . . . " embedded within templates containing data and print commands which describe families of documents or reports. The incoming pages can be stripped of their printer control codes and can be then used as rectangular arrays of characters which control the customization and reduction of the templates into one or more customized documents or reports containing data extracted from the incoming pages inserted at points marked by the "#mid" meta-command and similar meta-commands. A first template, with a "#startform" command, can cause the meta-command interpreter to process subsequent incoming pages against a designated template without the need for further triggering. The system provides global search and replace functions for all incoming pages as well as optional double-byte to single-byte conversion.

14 Claims, 11 Drawing Sheets

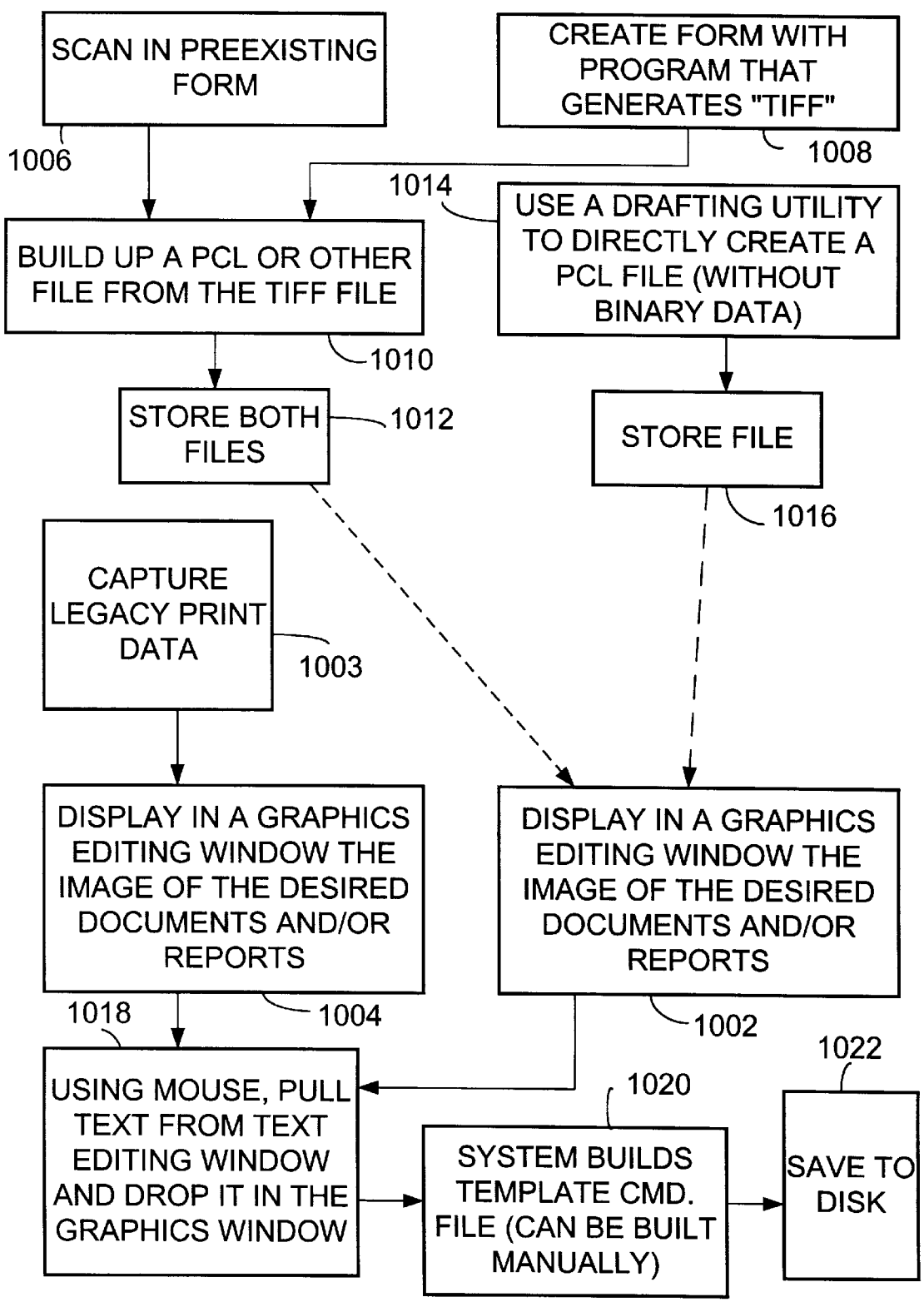

FIG. 11  TEMPLATE SET

[PROJECT]
Reports
[FORM]
Invoice
[TRIGGER]
"Statement"
[CORPUS]

. . . .

if "Overdue"; #then
    #line = 2;
    #mid 3, 8;
    #nl

. . . .

endif

. . . .

[OPTIONS]
MAXLINES = 80
PCL = YES
PRESCRIBE = YES
EXCHANGERATE = 1,95583
DECIMALPOINT = ","
AMOUNTSEPARATOR = "."
USESEPARATOR = NO
DECIMALPLACES = NO
TIMEOUT = NO

FIG. 12    COMPRESSED TEMPLATE SET

{ANCHOR FOR TRIGGERS}
{ANCHOR FOR TRIGGER COMMAND CODES
    AND STRINGS}
{ANCHOR FOR SYSTEM STRINGS}
{ANCHOR FOR CONTROL FILE STRINGS}
{ANCHOR FOR REPLACEMENT STRINGS]
{OPTION TABLE VALUES]
{STRING LENGTHS}
{TEMPLATE NUMBERS OF "DEFAULT" AND
    "EVERYFORM" TEMPLATES}
{TOTAL SIZE OF ALL FILES IN SET}
{STRING TREES}
{COMPRESSED TEMPLATES BEGIN HERE:}
 . . . .
1 {TEMPLATE NUMBER}
"Invoice" {TEMPLATE TRIGGER STRING}
 . . . .
0E {#if} {default row & column} {string pointer}
39 {#line} 1
02 {#mid} FFFF 8 2
07 {#nl}
 . . . .
0F {#endif}
 . . . .
AAAA {end of this template}
 . . . .

PROGRAMMABLE DATA EXTRACTOR, DATA ANALYZER, AND PRINTER REPORT GENERATOR

FIELD OF THE INVENTION

The present invention relates to programmable report generators, and more particularly to a printer that, in addition to serving as a conventional printer, may also be programmed to analyze incoming data, to extract significant data from the incoming data, and to generate documents and/or reports presenting that data in an attractive and useful manner, varying the type and number of reports generated in accordance with the nature of the data. The present invention is particularly useful in a networked environment where modern desktop publishing systems may be on the same network with mini- and mainframe computers programmed with "legacy" or purchased software that generates unattractive, character-oriented reports. The invention is also useful in environments where only such mini- and mainframe computers are present.

BACKGROUND OF THE INVENTION

Just a few years ago, most printers were inflexible devices that could only print letters, numbers, punctuation, and a limited number of symbols of a fixed size, or at best a very limited number of sizes and fonts. At the low end, dot matrix printers and spinning wheel printers predominated. Line printers were used to print reports from mini- and mainframe computers.

The introduction of the laser printer in the late 1980s was followed shortly thereafter by the development and introduction of highly flexible printer software engines that could print not only any type and size of character font but also graphic images as well as arbitrarily sized, rotated, and positioned lines, circles, and other geometric shapes. Adobe introduced Postscript and then Postscript II. Hewlett Packard introduced several generations of PCL. Prescribe was also developed for Kyocera printers.

Printers equipped with these printer control languages could produce reports of arbitrary complexity, and some printers were designed to accept several different printer control languages. However, no matter how sophisticated the printer languages became, these printers were still merely unintelligent servants of the computers that fed them data. They had to be fully instructed, with the instructions couched in the proper printer control language, on all aspects of how to go about creating any particular report or document. In the emerging field of personal computers, the emergence of Desktop Publishing software and third generation word processing software and office suites enabled individuals creating reports, brochures, and the like to take full advantage of the flexibility and power of these new printers and their control languages.

But in the field of business management, where mini- and mainframe computers predominated, it remained impractical to utilize the full power of these new printers. Much of the legacy software and leased or purchased software. found on these machines was designed to generate simple, text-oriented reports without fancy fonts and graphics on an earlier generation of printers. There is no cost-effective way in which much of this legacy and leased software could be upgraded to take advantage of the new printer capabilities, and accordingly most reports such as invoices, financial reports, and the like continue to be prepared with the traditional character-oriented formats that seem so unattractive and difficult to comprehend in this day of desktop publishing.

Some systems are known which can be set up to contain simple blank form documents, and to extract data segments from data flowing into a printer and move that data into blank spaces in the form documents. However, these systems are again performing rigidly-defined, simple tasks of form document completion and do not prepare highly customized reports after analyzing the data in an intelligent manner.

Accordingly, it is an object of the present invention to produce a printer that has the ability to analyze incoming data, extracting meaningful data and discarding the rest, and determining from the data what types and sizes of and numbers of documents and reports to generate.

It is a further object of the present invention to produce such a printer that, having analyzed the incoming data and extracted meaningful data therefrom, can then generate the specifications for a report of arbitrary complexity, tailored in accordance with the nature of the extracted data, and provide that specification to the printer's printing engine formatted in the printer's printer control language.

It is yet another object to achieve the above objects without in any way detracting from or interfering with the printer's ability to function in the normal manner when called upon by personal computers operating under the control of desktop publishing and word processing software and sharing the same network and printing facilities with mini- and mainframe computers programmed with legacy software or prepackaged, inflexible software and requiring the services of the printer's data analyzer, data extractor, and report generator.

Another object is to achieve such a printer in which the data analysis and report generation aspects of the printer can be quickly and simply reprogrammed to change the nature of the reports generated.

Yet another object is the envelopment of a meta-language for defining data analysis and extraction and report generation steps that are compatible with many different printers and printer control languages such that the meta-language may be intermixed with printer control commands to form report and document templates that can govern a printer's data extraction and document and report generation steps and that may be incorporated into different types of printers having different printer control languages.

SUMMARY OF THE INVENTION

Briefly summarized, these and other objects and advantages of the present invention are achieved in a printer having integrated within its mechanisms an incoming data analyzer, a data extractor, and a report generator which coexist compatibly with a conventional printer engine and printer or command language interpreter. The analyzer, extractor, and generator process meta-language commands that are embedded within document templates containing the meta-language commands intermixed with printer control commands and data. In the resultant integrated machine, the printer responds normally to incoming document definitions drafted in the printer control language of the printer engine, but the data analyzer continuously monitors the incoming information. When the data analyzer detects, within the incoming information, new document templates containing data analysis, extraction, and report generation meta-commands, the analyzer captures and stores these templates in the printer system's template memory for future use. At a later time, when the data analyzer detects incoming data that corresponds to and triggers the execution of one of the stored document templates, the data analyzer retrieves the corresponding document template and executes the meta-language commands that it contains, thereby transforming the generalized document template into highly customized documents or reports containing printer control commands intermixed with data extracted from the incoming data. The documents or reports actually generated are thus selected, arranged, and modified in accordance with and under the control of the extracted incoming data such that completely customized reports and documents are achieved without the need to have the computer from which the data flows generate the report specifications. In this manner, the entire burden of report generation and customization is shifted away from the computer and placed upon the printer.

These and other objects of the present invention are apparent in the drawings and in the detailed description which follows. The points of novelty that characterize the present invention are pointed out with particularity in the claims annexed to and forming a part of this specification.

BRIEF DESCRIPTION OF THE DRAWINGS

For a better understanding of the present invention, reference will be made to the drawings wherein:

FIG. 10 is an overview block diagram of the template editor which resides in the personal computer shown in FIG. 2;

FIG. 11 is a simple example of a document template containing meta-commands; and FIG. 12 is a simple example of the data which results from the compilation of a set of document templates.

DETAILED DESCRIPTION OF THE INVENTION

Figure 1:
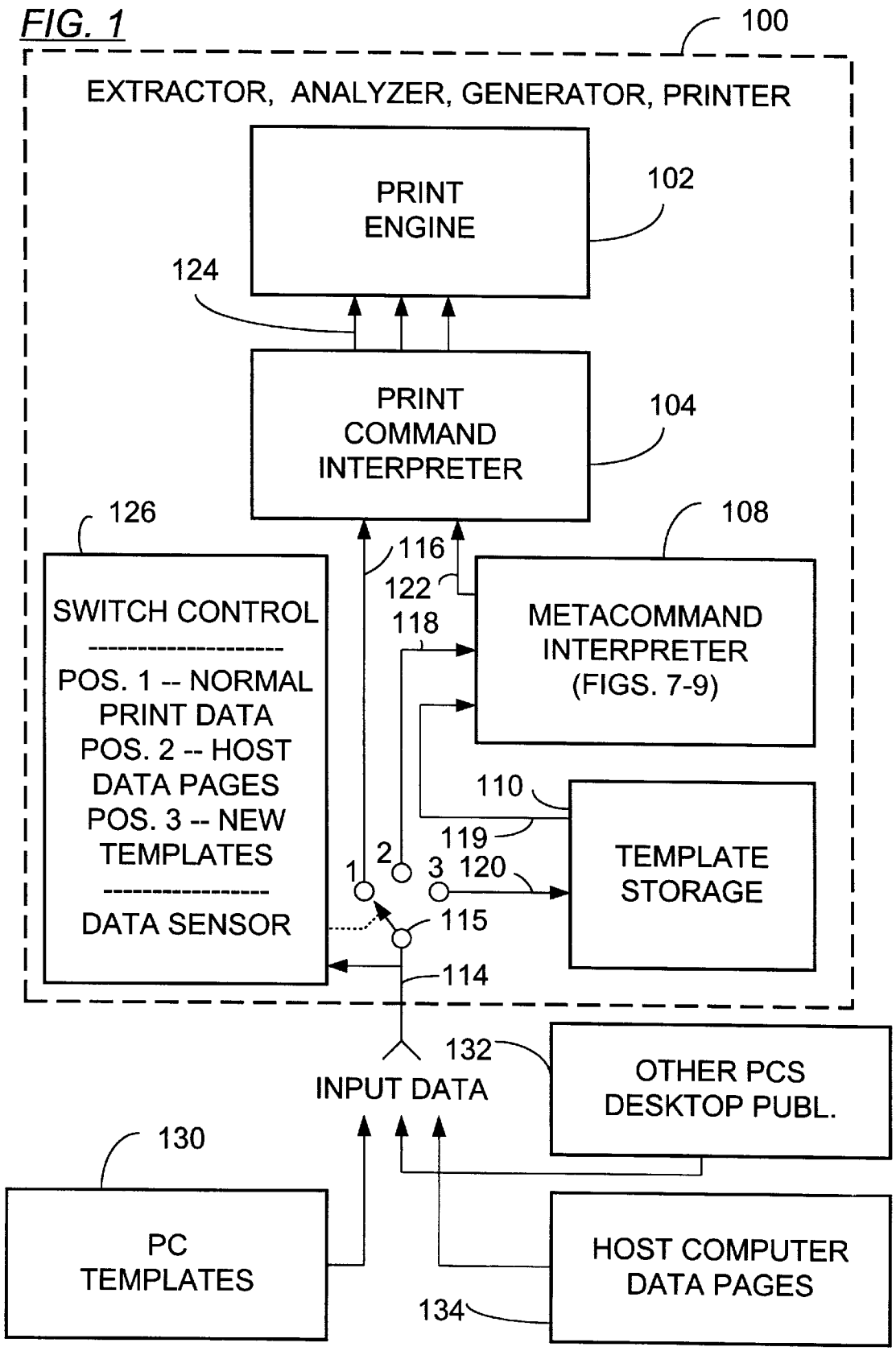
FIG. 1 is an overview block diagram of a programmable printer, data analyzer, and report generator designed in accordance with the principles of the present invention, and illustrating in a simplified manner the basic elements of the invention.

FIG. 1 presents a simplified block diagram of a printing system 100 that is designed in accordance with the teachings of the present invention. The system 100 includes a print engine 102, such as a conventional laser printer. The print engine 102 is driven and controlled by signals 124 generated by a computational print command interpreter 104, the interpreter 104 being designed to interpret and execute the print commands contained in any conventional printer control language, such as Adobe's Postscript language, Hewlett Packard's PCL language, or Kyocera's Prescribe language.

When configured to operate as a conventional printer, the printing system 100 accepts printer data from personal computers and desktop publishing systems 132 at a data input terminal. This data flows over signal wires 114 and 116 to the print command interpreter 104 which responds to the embedded commands in the printer data by controlling the print engine to draw lines and circles, to fill areas, to transfer bit maps, and to take other steps necessary to produce any desired type of printed output. The system 100 is thus designed to be installed within a legacy printer and to preserve that printer's normal mode of operation. Accordingly, in its first aspect, when a switch 115 is in the position 1 as shown, the system 100 functions entirely like any other conventional modern printing system.

However, many sources of data for such a printer come from older style host computers and other sources 134 which are unable to produce the necessary embedded print commands and data structures to create highly creative drawings of the type that are most attractive to the eye and most useful in a printed output. Some such host computers 134 may produce printer output data compatible with the command interpreter 104, and such computers may apply their data over the signal lines 114 and 116 to the print command interpreter 104 as previously described. However, such printing may nonetheless be unattractive, being composed of fixed size fonts with no graphics and no artistry to the presentation, and without any intelligence and without the chance to use the corporate logo and design of the users.

Accordingly, the present invention contemplates that a system designer will create a set of document templates 130. A template is a print document like any other, and it may contain a variety of printer control commands written in a language that is understandable to the print command interpreter 104. But in addition, templates also contain embedded meta-commands that are clearly distinguishable :from the print commands and data. The presence of these meta-commands in the templates causes them to be templates for many different types of output documents and reports, as opposed to defining a single document. These meta-commands are described in complete detail at a later point in this application.

The switch 115 is controlled by a switch control and data sensor 126 that monitors the incoming print data 114 looking for data patterns that identify a new set of templates 130 being loaded into the system 100. When such a new set of templates is detected, the switch 115 is thrown to the third position, and the templates are routed over the data path 120 into the template storage 110. In this manner, multiple templates defining many different types of forms, documents, and reports may be created and stored within the system 100 for optional future use in controlling the printer system 100.

The system 100 further contains a meta-command interpreter 108 which is an interpretive processing system that can accept as its command input one or more of the templates 130 retrieved from the template storage 110. The meta-command interpreter 108 skips past the embedded data and print commands and finds the distinctive meta-commands embedded within the template and executes them in the same manner that an interpretive processor finds commands in a language such as Basic and executes them.

Normally, the meta-command interpreter 108 is inactive, and the switch 115 remains in the number one position routing input data directly to the print command interpreter 104 which then controls the print engine. However, the switch control and data sensor 126 is designed to monitor the incoming pages of data, page by page, checking for the presence within any given incoming page of certain patterns of characters which may be called "triggers." The presence of such a trigger in an incoming page indicates that the incoming page is to be treated as data input to the meta-command interpreter 108. The trigger further identifies a particular one or more templates within the template storage 110 which the meta-command interpreter 108 is to select and use as a program governing the operation of the meta-command interpreter 108. The commands within the template direct the meta-command interpreter 108 through the process of selecting certain strings of characters from the incoming page of data, combining those strings with other data contained within the template, and varying the data within the template that is selected in accordance with other data that may be present within the incoming page. Accordingly, the entire system 100 then functions as an automated customized document assembly system which assembles any desired number and type of customized documents. The size and content of these documents is controlled by information within the incoming page, and these documents also contain embedded within their text excerpts taken from the incoming page. In this manner, individual pages of information provided by a host computer 134 may by torn apart and reassembled by the meta-command interpreter 108 into multiple reports formatted so as to be both useful and attractive and then printed by the print engine 102 under the control of the print command interpreter 104.

The templates, from one point of view, are computer programs controlling the operation of the meta-command interpreter 108. From another point of view, the templates themselves are generalized form documents, containing optional and alternative passages and passages that must be repeated or replicated a variable number of times, which the meta-command interpreter reads, strips free of the meta-commands, and reassembles into highly customized documents or reports under the control of the specific data contained with the incoming pages that are provided by the host. Accordingly, the system 100 is able to extract data from host pages, analyze that data, generate customize documents and reports under the control of that data in accordance with information contained in the document templates, and then print the resulting documents and reports. The templates may also contain printer configuration commands relating to selection of paper input tray, paper output sorter, and other such sophisticated printer features Accordingly, without making any changes whatsoever to the print data provided by the host computer 134, the system 100 can be programmed to generate highly customized reports, and the nature of those reports may be changed whenever necessary by simply providing new or modified templates 130 to the system 100.

Figure 2:
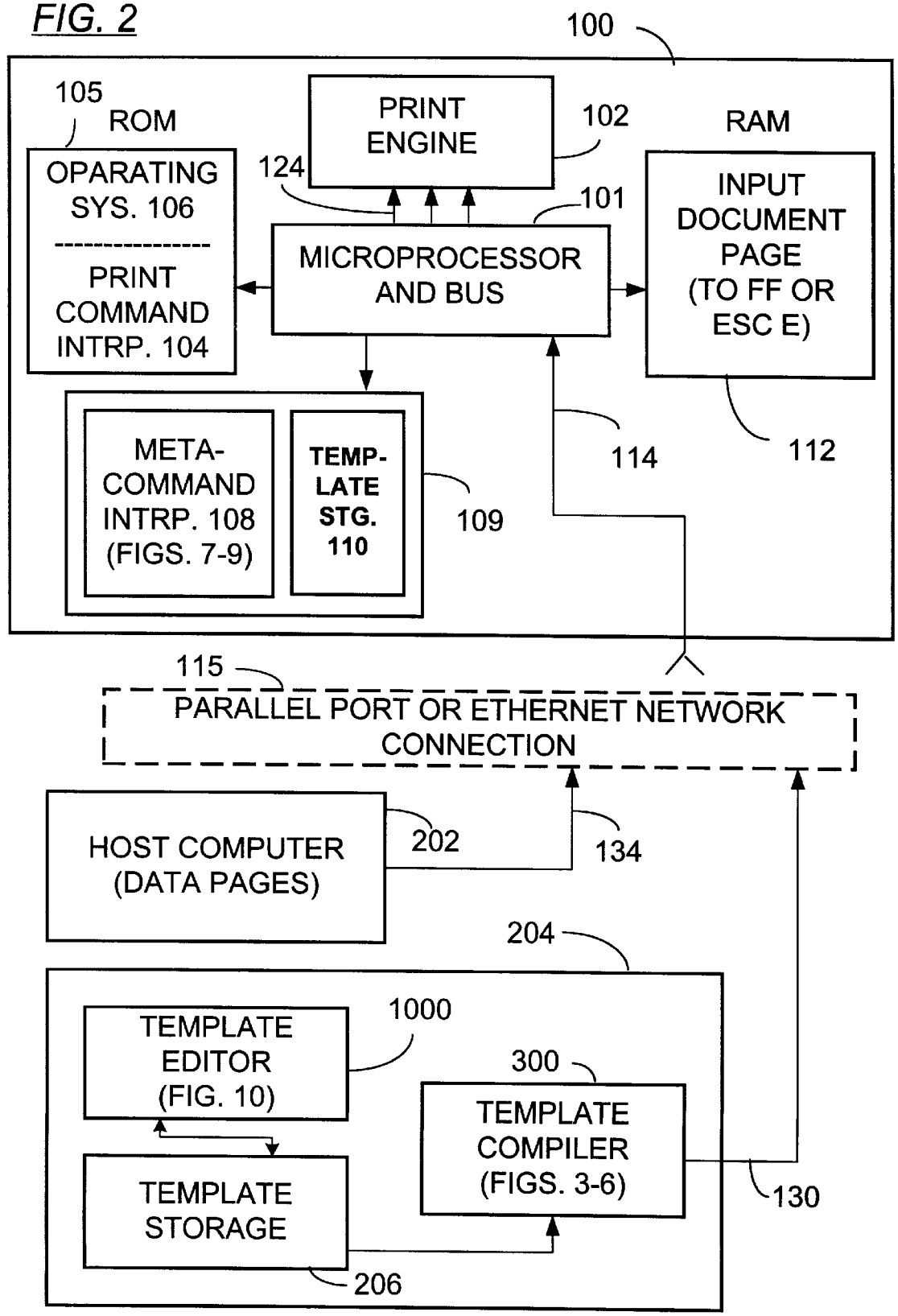
FIG. 2 is a more detailed and hardware specific block diagram of such a printer, analyzer, and generator, implemented on a conventional printer with additional software resident in a ROM on a PCMCIA card.
Figure 3:
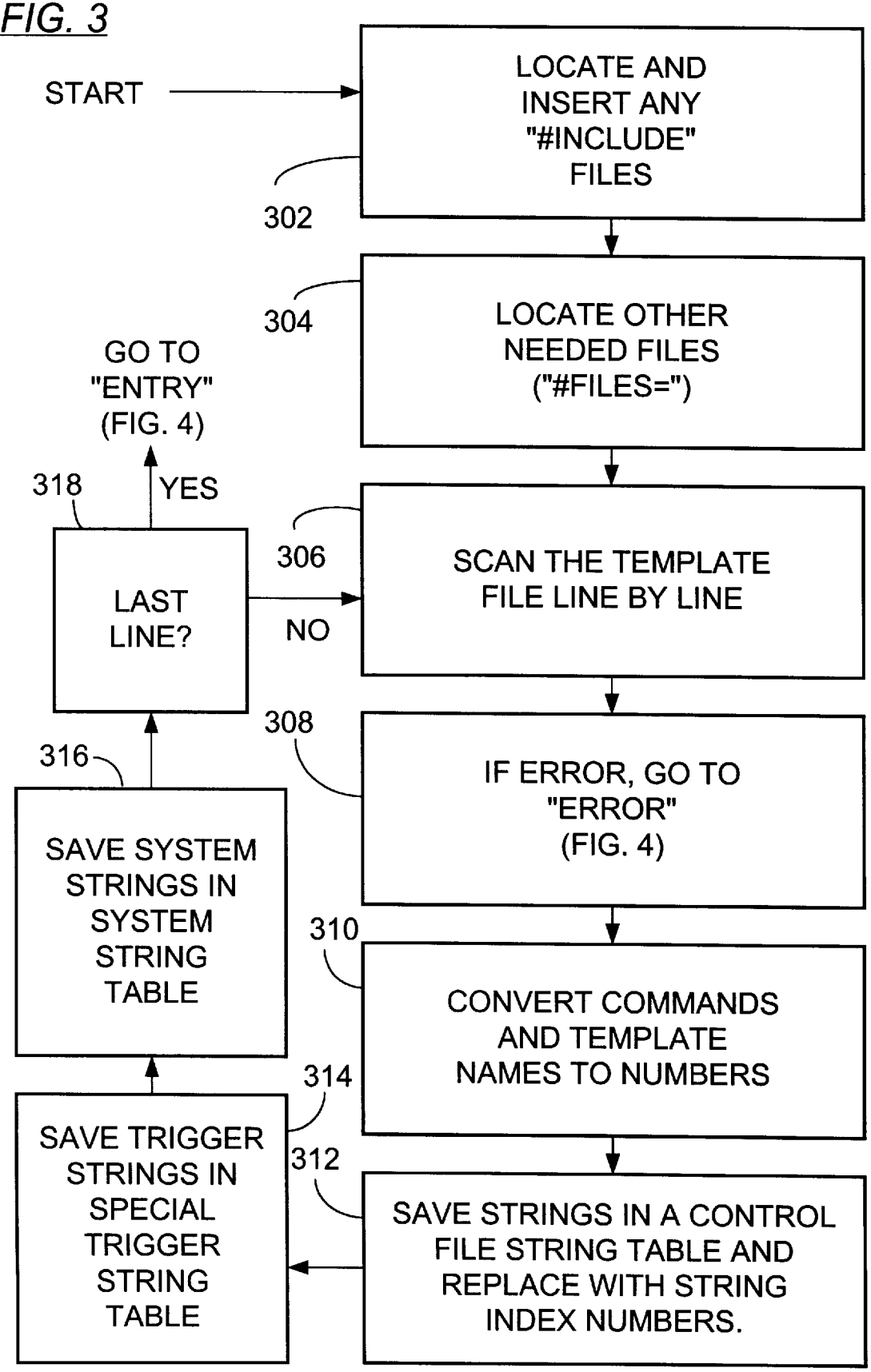
FIGS. 3 through 6 present a detailed blocked diagram of the template compiler which resides on the personal computer shown in FIG. 2.
Figure 4:
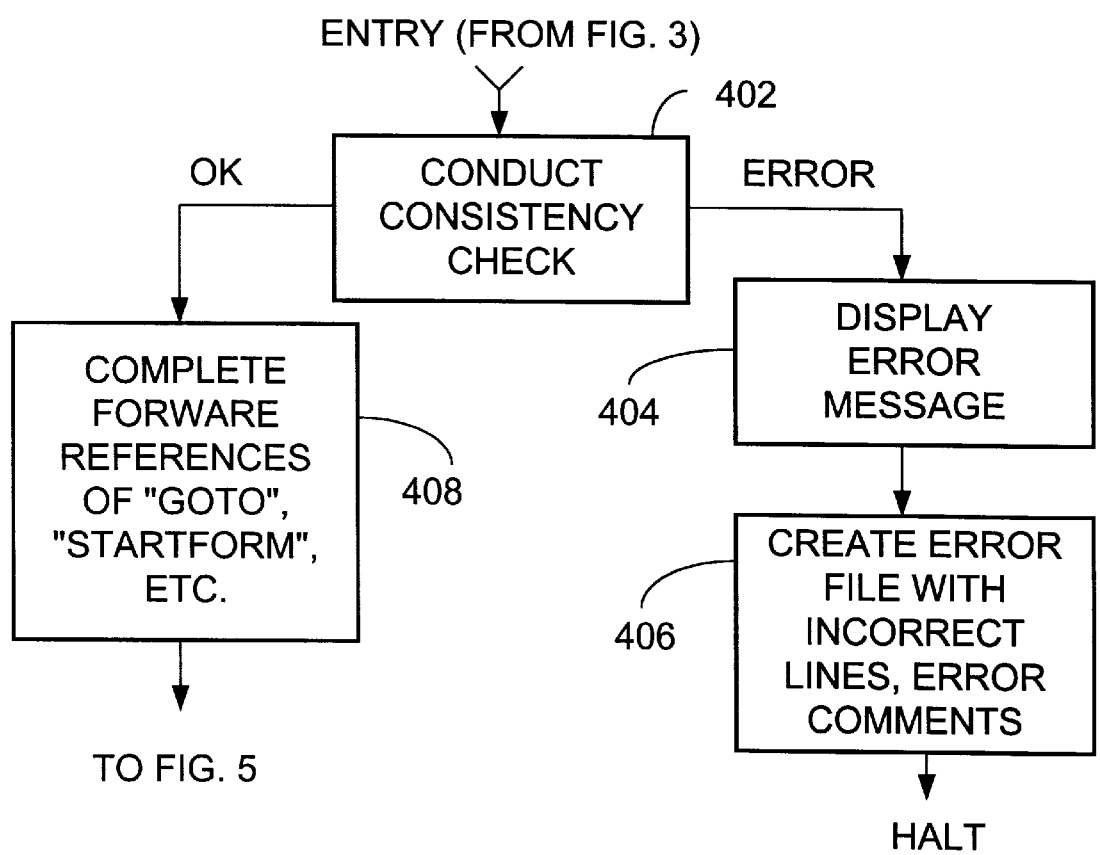

The presentation of the system 100 is somewhat simplified in FIG. 1 to make the basic concepts of the invention easier to understand. FIG. 2 presents a more accurate representation of the hardware elements in the system 100, and that figure will be described next. The system of computer programs which forms a part of the system 100 is depicted most accurately in FIG. 7 and also in FIGS. 8 to 9.

Referring now to FIG. 2, the system 100 is shown to include the print engine 102, which is connected by the signal lines 124 to a microprocessor and bus system 101. The details of the microprocessor and bus system 101 are conventional and are not disclosed. The preferred embodiment of the present invention is designed around an existing printer, for example, the Kyocera model FS-7000 printer.

Connected to the microprocessor and bus 101 is one or more read only memories 105 containing an operating system 106 for the microprocessor and also containing the print command interpreter 104 which can interpret Prescribe printer commands. Also connected to the microprocessor and bus 101 is a random access memory 112 in which a document to be printed may be temporarily stored while it is processed by the print command interpreter 104 which sends commands to the print engine 102 over the signal lines 124.

The input data signal line 114 flows directly to the microprocessor and bus 101 as an input channel of the microprocessor and bus 101 controlled by the operating system 106. The switch 115 is not shown in FIG. 2 because the switch 115 is not implemented as an actual hardware switch 115 but rather it is implemented in the program system 700 (FIG. 7) as software data switching and/or moving elements 702, 704, and 706 which will be described at a later point.

In the preferred embodiment of the invention, the system 100 has a PCMCIA slot or bus adapter 109 which contains an electrically erasable programmable read only memory card, or EEPROM. Contained within the EEPROM are the meta-command interpreter 108 computer program, written in and executable in the native machine language of the printer's microprocessor, the details of which appear in FIGS. 8 and 9, and also memory space for the template storage 110 in which one or more "projects" or sets of document templates may be stored.

The data input signal line 114 can connect to either a conventional computer parallel port or to an Ethernet port. Conventional networking hardware 115, including any necessary cables and routers and the like, interconnect this port to the ports of any desired number of host computers 202 by means of data paths 134 and personal computers 204 by means of data paths 130. In this manner, the system 100 may be shared by any desired number of computers inter connected by a network.

The particular personal computer 204 shown in FIG. 2 is designed to be used by the system designer who designs and maintains the templates. It contains a template editor 1000, the details of which are presented in FIG. 10, which enables the system manager to create, review, and revise templates. These are stored in a template storage 206 on the hard disk of the personal computer 204 or on equivalent network server storage space. When a template set is ready, a template compiler 300, the details are shown in FIGS. 3 through 6, compiles or compresses the templates into a much more compact, machine-readable form in which, for example, human-understandable meta-command names are replaced with numbers. The compiled templates are fed over the network 115 to the system 100 and are stored in the template storage 110 where they are available to control the operations of the system 100.

Figure 7:
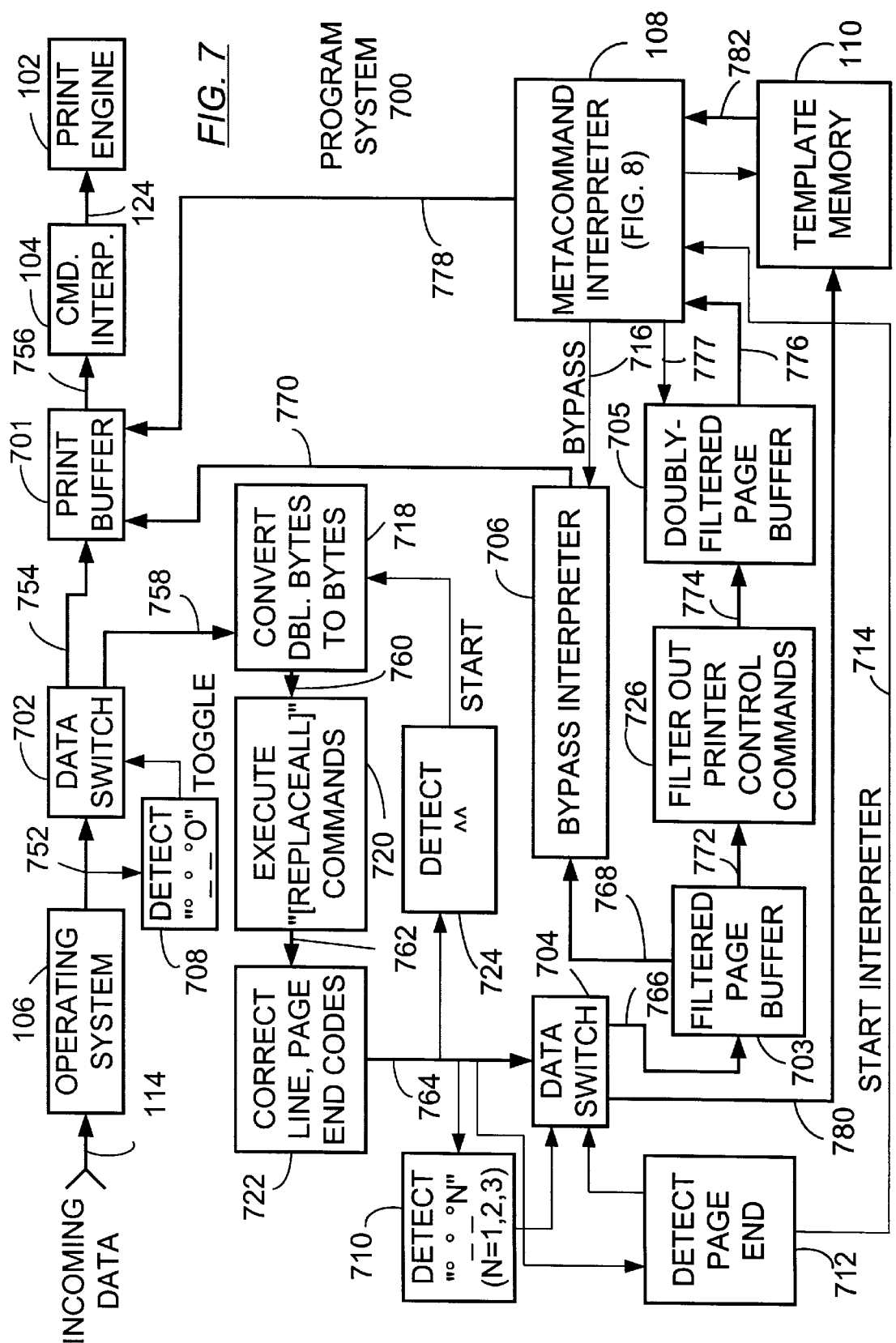
FIG. 7 presents an overview block diagram of the program system that resides within the printer shown in FIG. 2, and also depicts the flow of data through the printer program system to the print engine, illustrating how reports can be generated following extraction and analysis of data from the incoming data pages.

Referring now to FIG. 7, the program system 700 for the data extractor, data analyzer, report generator, and printing system 100 is shown both as a block diagram of the program elements of the system and also as a data flow diagram depicting the data paths over which the incoming data flows on its way to the print engine 102. The program system is arranged, with respect to the resident printer operating system 106, such that the incoming data 114, instead of flowing directly from the operating system 106 to the command interpreter 104 where it is used to direct and to control the print engine 102, flows instead from the operating system 106 to the program system 700 where it is first processed and then placed into a random access memory print buffer 701. The system 700 then calls upon the command interpreter 104 to print the prepared data presented by the print buffer 701. In this manner, the program system 700 is positioned to intervene or not in the data preparation and printing process.

By way of brief explanation, the lines in FIG. 7 numbered 114, 124, and 752 through 782 are the data transfer paths, indicating the flow of data between data buffers and through program data processing elements of the program system 700. The data switch elements 702, 704, and 706 are shown in FIG. 7 as if these were actual hardware switch elements routing the data over one signal path or over another signal path. In reality, data may be moved about from one place to another by character or string move commands, and processed as it is picked up and examined prior to any such movement; or if the data is not processed, pointers to the data may be simply be passed from one program element to another such that the movement of data suggested by FIG. 7 is merely a symbolic representation for the passage of data pointers from one software element of the system to another. The particular manner in which these data transfers are accomplished is a simple matter of design choice on the part of the programmer.

A first data switch 702 is designed to allow apparent complete removal of the program system 700 by allowing data to flow directly from the operating system 106 over the data path 752, 702, 754 directly to the print buffer 701 before the data passes over the data path 756 to the command interpreter 104. The switch 702 is controlled by a detect logic 708 which is a program that searches for the data pattern "°_°_°O" in the incoming data. Whenever that special symbol is detected, the data switch 702 is toggled to either remove the program system 700 from active service, so that the printer behaves as if the program system 700 were not present, or to place the program system 700 into service, such that the data is routed by the data switch 702 over the data path 758 and into the program system 700. By default, when the system is first turned on, the data switch 702 is switched to pass all incoming data to the system 700 over the data path 758. But in any instance where the program system 700 might interfere with normal printer operation, it is a simple manner to send the proper code to the data switch 702 detect logic 708 to thereby prevent any adverse interactions from happening, and to reset the data switch 702 back at the end of the printer operation.

Assuming the data switch 702 is in its normal position, routing the incoming data from the operating system 106 over the signal path 758, the data flows over the signal paths 758, 760, 762, and 764, through the data switch 704, and over the data path 766 to a filtered page buffer 703 which is established by the program system 700 in a random access memory.

The incoming data 114 flows over this path and into the filtered page buffer 703 until a special detect page end 712 program detects that a complete page of data has been received and is contained within the buffer 703. The detect page end 712 program is fully capable of looking for simple page end signals, such as the "form feed" ASCII character, and it also includes a print command parser that is able to parse commands of the type intended for the command interpreter 104, and thereby it can detect page end codes that are complex and that are not readily detected by simple logic.

When an entire page is contained within the buffer 703, the detect page end 712 program generates a start interpreter signal 714 (which could be a subroutine call but which might, in some other printer, be implemented as a software interrupt) which places the meta-command interpreter 108 into operation.

Figure 8:
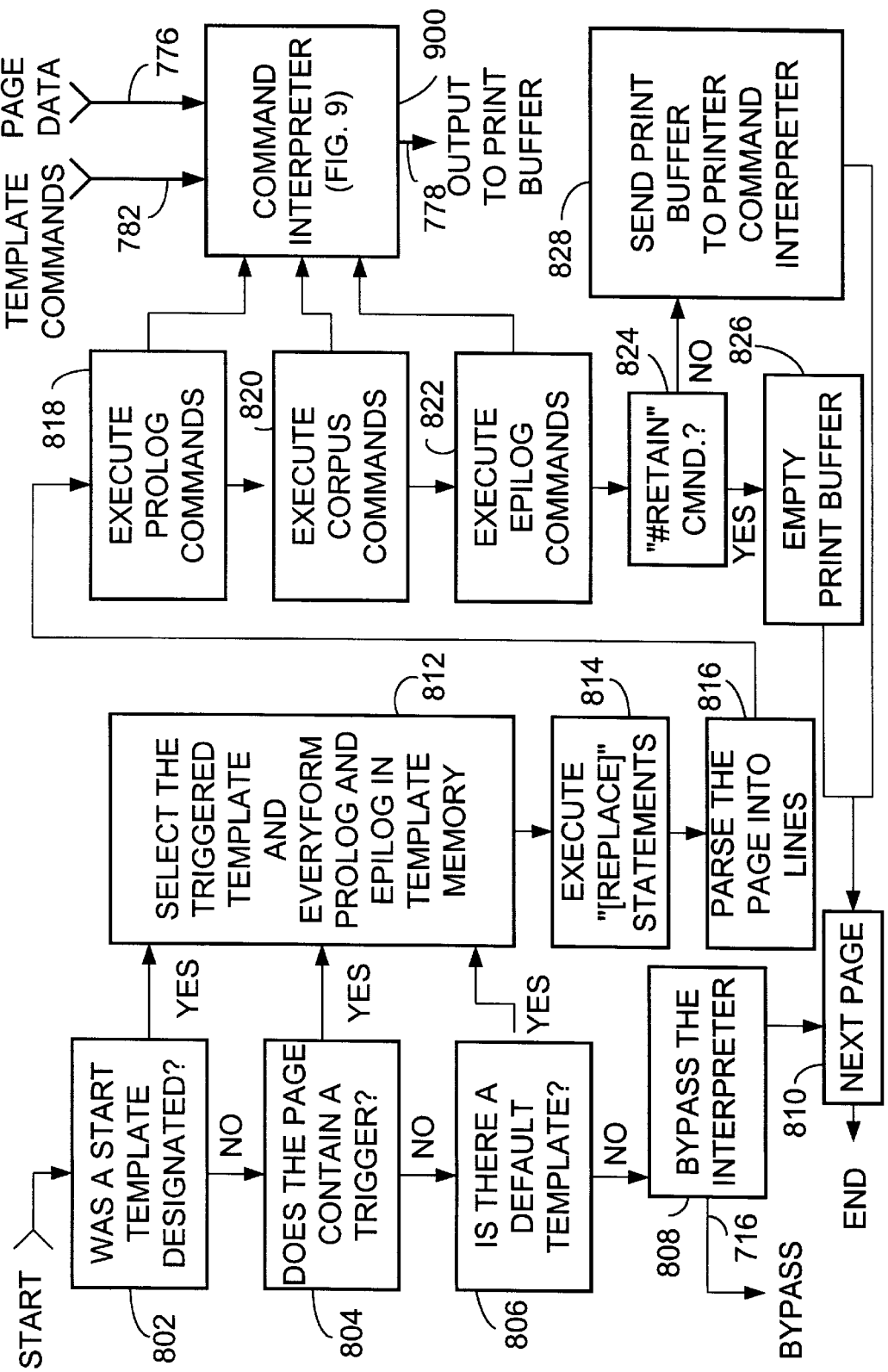
FIG. 8 is a block diagram of the meta-command interpreter shown in FIG. 7.

With reference to FIG. 8, the meta-command interpreter 108 performs three tests to see whether or not the incoming page in the buffer 703 is one that should be processed as data for one of the document templates contained in the template memory 110. First, at step 802, it checks the templates to see if any "start" template was designated by a template executed previously. If not, then it checks to see at step 804 if the incoming page in the page buffer 703 contains any special trigger sequences of characters. The trigger, if present, triggers the execution by the meta-command interpreter 108 of a particular template. If not, then the system 700 at step 806 checks to see if a. template named "default" exists in the template storage 110. If all three of these steps 802, 804, and 806 fail, then at step 808 the meta-command interpreter 108 concludes that meta-command interpretation should be bypassed, and it generates a bypass signal 716 (which may be a subroutine call, etc.) which causes a bypass interpreter data switch 706 to route the data from the filtered page buffer 703 over the data paths 768 and 770 directly to the print buffer 701. Then the command interpreter 104 is called upon to accept the page of data and to use it in the conventional matter to control the operation of the print engine 102. With reference to FIG. 8, the meta-command interpreter 108 executes a fetch next page 810 program which causes the next page of incoming data to be loaded into the filtered page buffer 703 so that the entire operation just described can be repeated again and again.

The operation just described corresponds to FIG. 1 when the switch 115 is in position 1 such that data flows directly to the print command interpreter 104 which controls the print engine 102. However, FIG. 7 reveals that the data flows through three software elements which can perform filtering and data conversion. In response to a double byte command "^^", a convert double bytes to bytes 718 program presumes that the incoming data is encoded in what is called double-byte form, where incoming double-byte printable characters must be converted into single-byte characters which include both printable characters and non-printable commands before the incoming data is fed to the print command interpreter 104 or meta-command interpreter 108. For example, the incoming data may be coming from a host computer incapable of sending every kind of non-printable command or escape code to the printer, or the data may be coming over a network that strips away the parity or eighth bit of each byte, thereby making it impossible to send 8-bit bytes to the printer. With such systems, it is customary to represent a single data byte not by 8 bits of information but by 16 bits of information containing the encoding in accordance with the ASCII code for the two hexadecimal digits that represent the ASCII assigned number of any given data byte. For example, the "carriage return" character is normally represented by the byte whose binary digits are "00001101". The two hexadecimal digits that may be used to represent the position of the "carriage return" in the ASCII sequence are "0D" which correspond to decimal "13." Accordingly, if the information is double-byte encoded, the carriage return is represented by "0", encoded as "00110000"; and by "D", encoded as "01000100". Accordingly, the carriage return, sent by double byte encoding, would be represented as "00110000010100". The present invention contemplates that all printable pages containing double bytes will be proceeded by "^^" as the flag that double byte to single byte conversion is required, or by some other user-designated code (as will be explained). The conversion to single bytes is then performed by the convert double bytes to bytes 718 program automatically.

The present invention also contemplates that certain strings of characters within the incoming pages of data may be deleted from the data stream or replaced by other strings of characters specified by a "[REPLACEALL]" meta-command that can be found within the template memory 110 but that is not assigned to any one template. The filter logic 720 program implements all such "[REPLACEALL]" commands on all incoming data regardless of whether or not that data is processed by the meta-command interpreter 108 or passes through the bypass interpreter switch 706 to flow directly to the command interpreter 104. The purpose of this feature is mainly to convert data streams originally intended for older legacy or other incompatible printers to languages laser printers understand.

A third filter is one that can correct line and page end codes 722. Once again, line and page end code conversion is defined in a part of the template memory 110 that is not assigned to any single template. This is to correct for general incompatibility between the host and other computers attempting to use the printer and the command interpreter 104 in terms of how line endings and page endings are encoded. For example, UNIX systems generally mark the ends of lines only with a "line feed" command, whereas PC systems generally mark the end of lines with a "carriage return, line feed" pair of commands. The correct line and page end codes 722 filtering program can be set either to convert the standard PC line ending into a standard UNIX line ending or vice versa, depending upon the particular needs of a given installation, and to perform other similar tasks.

If a particular computer does not wish to have the logic 718, 720, and 722 filter its data before printing, then that particular computer inserts into the printer data stream the special code that switches the data switch 702 so as to bypass the program system 700 entirely whenever that computer is using the printer, and to switch back after that computer is done with the printer.

If the incoming data is a brand new template specification, it must be prefixed by "°_°_°1" (in the case of some Kyocera printers, this command may be preceded by a "form feed" character to insure that there is no half-processed page in the buffer). This is detected by the detect 710 program which then switches the data switch 704 and routes the incoming template-defining data over the signal path 780 and into the template memory 110. This operation corresponds to the switch 115 shown in FIG. 1 being in position 3 and routing template data into the template storage 110. In this manner, the set of templates may be replaced or updated at any time. The detect 710 program responds differently to the suffix numbers 1, 2, and 3, storing the templates in RAM memory in response to the code "°_°_°1", storing them in programmable read only memory in response to the code "°_°_°2", and storing them in both RAM and programmable read only memory in response to the code "°_°_°3". While not shown in FIG. 7, the code °_°_°4 will cause the incoming data to be interpreted as a brand new meta-command interpreter 108 and to be stored within the PCMCIA card as an entirely new program system 700 for the system 100. The program system 700 is written in "C" and is compiled into the native language of the microprocessor and bus 101. This makes it easy for the system designer to update to newer versions of the software.

Returning to the point where the detect page end 712 program detects the end of the incoming page that is flowing into the filtered page buffer 703, irrespective of whether or not the bypass interpreter data switch 706 is actuated to transfer the contents of the filtered page buffer 703 directly to the print buffer 701, the data within the filtered page buffer 703 is passed over a signal path 772 to a filter 726 which filters out printer control commands, and then the doubly-filtered data is passed over the signal path 774 to the doubly-filtered page buffer 705. The printer control commands filtered out by the logic 726 are the Postscript, PCL, or Prescribe commands or other commands intended for the command interpreter 104. The logic 726 actually parses these commands so that it is able to determine their exact scope and depth and to carve them out precisely, leaving behind an input page of filtered, printable data characters and line ending codes.

The present embodiment is able to parse and filter out, and also to detect page ending codes, in the languages Postscript, PCL, or Prescribe. It would be a simple matter to enhance the software to handle future printer control languages as well as the printer control languages of legacy dot matrix printers, such as the extended ASCII printer language and the Epson printer language.

When the detect page end 712 program determines that a complete page is within the buffers 703 and 705, as explained above, it generates a start interpreter signal 714 that places the meta-command interpreter 108 into operation.

With reference to FIG. 8, an overview block diagram of the meta-command interpreter 108 is presented, with the details of the command interpreter 900 that actually detects and executes the embedded meta-commands set forth in FIG. 9, which will be described at a later point.

Whether the meta-command interpreter 108 is placed into operation is determined by the three tests at steps 802, 804, and 806, described briefly above.

To be more specific about these tests, it needs to be understood that most templates contain, within their meta-command specifications, a designation of a very specific triggering string of characters which, if found within an incoming page of information, triggers the processing of that template into one or more reports or documents under the control of the incoming page of information. Accordingly, when an incoming page containing such a trigger flows into the filtered page buffer 703 and from there into the doubly-filtered page buffer 705, step 804 of the meta-command interpreter 108 scans the data within the doubly-filtered page buffer 705, detects the triggering string of characters, and then transfers program control to step 812 where operation of the meta-command interpreter proper commences. Accordingly, performance of the step 804 involves scanning the incoming page of data within the buffer 705 looking for any trigger for any of the multiple templates that may be present within the template memory 110. If a trigger is found, then the corresponding template within the template memory 110 is retrieved and fed over the signal path 782 to the command interpreter 900 within the meta-command interpreter 108. The sequence of meta-commands within the triggered template becomes the computer program that directs the operations of the command interpreter 900.

It is also possible, during the execution of a first template containing meta-commands, for a special meta-command called the "#startform "<name>";" command to be encountered. This is the "#startform" meta-command, and it designates a specific document template by name that is to be used to control the processing of the next and subsequent incoming page of data that is fed into the system 100, even though that data may not contain any triggering string of characters. This affords processing of dynamic and multiple page forms, and is an important and significant feature of the present invention not found in other systems.

For example, suppose that a continuous flow of multiple pages of host data comes into the system 100, the first page of which contains some type of a title page, and the remaining pages of which simply contain repeated blocks of data. The word "title" within the title page could be designated as a triggering string for a document template named "first page" so that when the title page appears, the "first page" template is selected and is processed by the meta-command interpreter 108 to create a suitable title page. Within that first "title page" template, the "#startform" meta-command could appear followed by the template name "datapage" as follows:

startform "datapage";

In this manner, the system 100 programs itself to use the special "title page" template for the first page of data, and to use the "datapage" template for subsequent pages, even without the need for there to be any trigger string available within those subsequent pages. When the last page of a given report is processed, an "#endform" meta-command cancels this automatic triggering of the "datapage" template.

After a first template has designated such a "#startform", a flag is set within the meta-command interpreter 108 that causes the step 802 automatically to designate the document template that will be used to process the next and subsequent pages of incoming data and automatically to refer processing over to the step 812, where meta-command execution begins.

If neither of the steps 802 or 804 is triggered, there is still the possibility that a given set of templates contains a template which has been assigned the template name "default" by the system designer. If so, then this "default" template is used for every page of incoming data that is encountered which does not contain a specific trigger. The presence of a template named "default" within the template memory 110 accordingly is the event that triggers the execution of step 806, and the meta-command interpreter 108 is always placed into operation regardless of the presence or absence of a triggering signal. The meta-command interpreter 108 is accordingly never bypassed by the data switch 706 (the bypass data switch 702 may still be used).

Referring now to FIG. 8, any given template for a report or document may contain a "[PROLOG]", a "[CORPUS]", and an "[EPILOG]". If all the templates require the same prolog and epilog set of commands, then these may be placed together into a template named "everyform" and then all templates will automatically use the "everyform" epilog and prolog along with the corpus from whatever template was triggered into execution. If there is no template named "everyform", then the prolog and epilog commands associated with a given template are executed before and after the corpus commands are executed. In any case, the logic at step 812 selects the triggered template and the appropriate prolog, corpus, and epilog sets of commands from within the template storage 110 such that the commands flow sequentially over the data path 782 (FIG. 7) into the command interpreter 900 which also receives data from the incoming page buffer 705 (FIG. 7) over the data path 776 (FIG. 7) in response to the execution of data fetch commands 777 (FIG. 7).

Having arranged for the proper series of meta-commands to flow towards the command interpreter 900, meta-command interpreter 108 next executes (step 814 in FIG. 8) any "[REPLACE]" meta-commands found within the triggered individual template at step 814. Unlike the "[REPLACEALL]" meta-commands which are applied to every incoming data page, the "[REPLACE]" meta-commands are specific to individual templates and may vary from one template to another.

Next, at step 816, the data within the doubly-filtered incoming page buffer 705 is rearranged into a rectangular array such that each line occupies one horizontal row of the array and so that individual characters within each line the same number of character positions from the beginning of the line occupy the same vertical columns of the array. This arrangement is necessary to facilitate retrieval of the incoming page data by row and column coordinates. It will be recalled that the incoming data page has already been stripped of its printer commands, and accordingly this rectangular arrangement of data serves as a data base which the meta-command interpreter 108 can use both as a source of data to be included within the document or report being created and also as a source of control information to control, the selection of optional and alternative passages and the repetitive generation of multiple passages.

Next, at steps 818, 820, and 822, the prolog meta-commands, the corpus meta-commands, and the epilog meta-commands are sequentially executed just as if the template were a computer program. Templates do resemble computer programs in that they contain "#if" logic, "#for . . . #next" repeat logic, and other such common programming language structures. They differ from standard programs in that everything in the background of a template, not part of a meta-command, is presumed to be data (which is to be printed) or printer control commands. Also, this background information may contain meta-command references to specific data within the incoming page, by row and column, which data is to be inserted at a particular point into the data that is to be printed. Since this background information which is to be sent to the printer can contain any Postscript, PCL, Prescribe, or other commands in the language of the command interpreter 104, these templates can take data from pages formatted in a first way in terms of character size and font and, by proceeding such data with the proper Postscript or other such commands, cause the data to be printed formatted in an entirely different way, either made larger or smaller, or set in a different type font, or even converted into a bar code or other useful representation that the host computer, for whatever reason, was unable to handle or produce, or where it would have been too costly or inconvenient to adjust the host computer.

The command interpreter 900, accordingly, proceeds to create one or more documents or reports and to feed them over the data path 778 (FIG. 7) to the print buffer 701.

When a template has been fully executed, step 824 checks to see if a "#retain" command appeared with the template. If so, then at step 826 the print buffer 701 is emptied, and the material is not printed but is simply discarded. But if there was no "#retain" command, then at step 828 the print data within the print buffer 701 is sent on to the command interpreter 104 where it causes the print engine 102 to- print out the reports defined by the printer commands found within the template and selected by and arranged by the meta-command interpreter 108.

Figure 9:
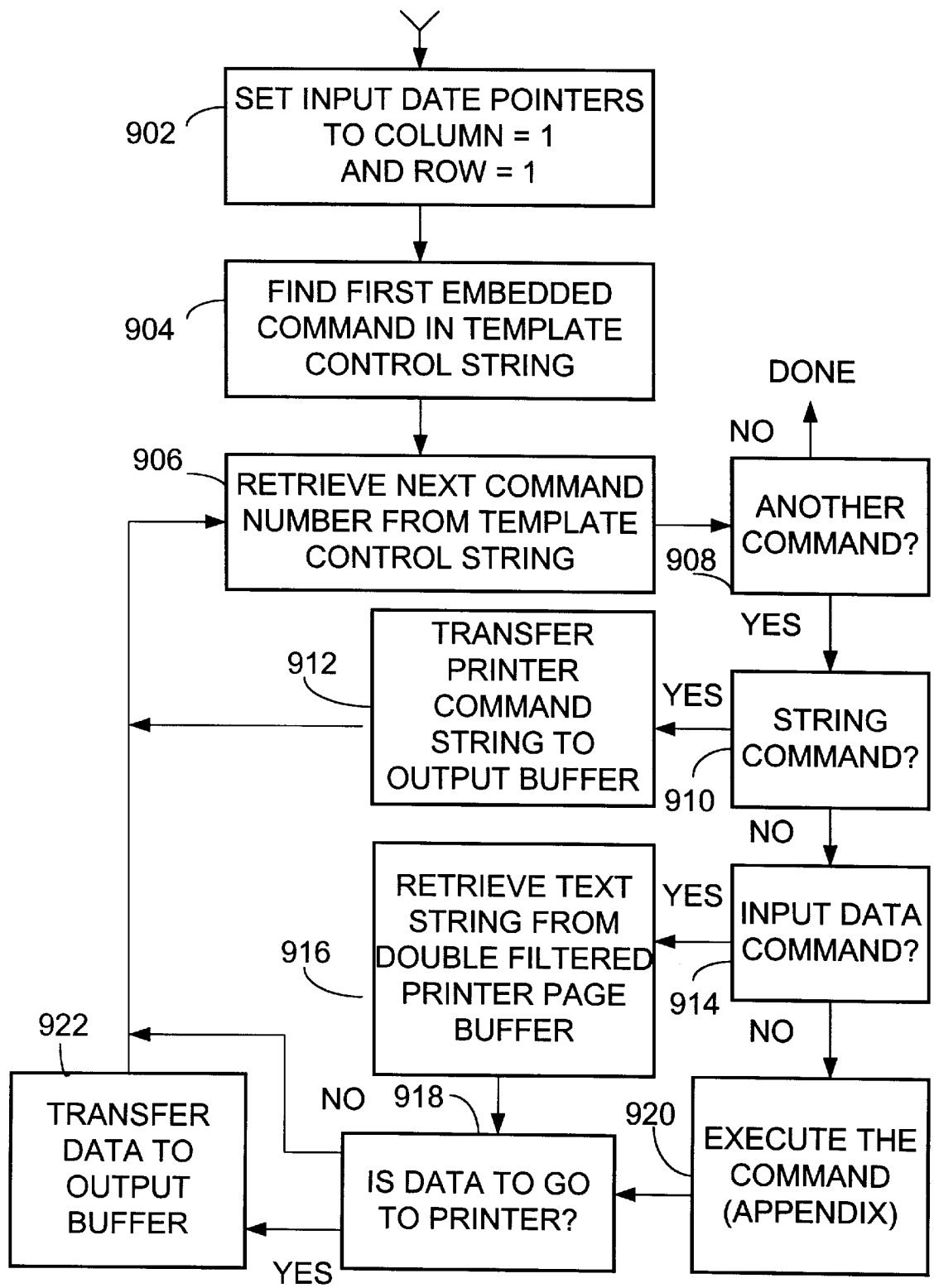
FIG. 9 is a block diagram of the command interpreter shown in FIG. 8.

With reference to FIG. 9, the command interpreter 900 is shown in block diagram form. Further details of the command interpreter 900 can be found in the Appendix and in the brief description of the Appendix which is presented just ahead of the Appendix.

When a block of compiled template commands is presented to the command interpreter 900, first the input column and row pointers, which refer to the array of incoming data within the doubly-filtered page buffer 705, are initialized to the values "column=1" and "row=1" (step 902). The meta-commands may alter these values, as is explained below.

Next, the command interpreter 900 recovers from the template memory 110 the meta-command string that is to be interpreted, which following compilation and compression will resemble the last few lines of FIG. 12, and proceeds to select the next command number in the string ("0E" for "#if" in FIG. 12)—Step 904.

The command interpreter now enters a loop or repetitive operation which begins at step 906. It retrieves the next command number from the command string. If, instead of another command, the end-of-command-string flag "AAAA" is encountered, then that flag signals that no more commands are left to processing, and processing is done (at step 908). Otherwise, if there is another command to process, program control continues at step 910.

If the meta-command is a command representing a string of text or printer commands that are to be sent to the printer's command interpreter 104, at step 910, this action is performed immediately. The string, which the compiler 300 stored in a tree structure within the template storage 109, is retrieved and transferred to the print buffer 701.

At step 912, if the command represents text to be carved out of the incoming page of information, at step 914, the command is executed at step 916, where the text is retrieved from the doubly-filtered page buffer 705 and is held, as an argument for some other meta-command, or, at step 918, if the data is to go to the printer, then at step 922 it is sent to the print buffer 701.

At step 920, if the command is executable, as in the case of the "#if" command, then the command is executed; and if execution results in data to go to the printer at step 918, that data is transferred to the print buffer 701 (step 922).

In every case, program control returns to the step 906 where the next command, if any, is retrieved and executed. This process continues until all the commands have been fully executed—all that were not excluded by the process of selecting optional and alternative passages as well as replicated passages, as is explained below more fully.

The remaining figures in this patent, as well as the appendix, focus more particularly upon the elements of the invention which help to create, compress, and later interpretively process the meta-commands which are embedded into the templates. Before proceeding to describe these elements of the invention, it will be helpful to describe the meta-command language that is used in drafting templates for documents and reports.

The present invention contemplates embedding meta-commands into a document formatted to control a printer and containing printer commands, such as Postscript, PCL, or Prescribe commands. Some of the meta-commands used in the preferred embodiment of the present invention are enclosed within brackets so that they may be recognized and easily distinguished from the printer text and printer commands into which they are embedded. Other embedded commands are identified by a number sign "#" prefix followed by a key word, the key word serving as a command name which is followed by whatever arguments a given command requires. If arguments are present, a semicolon terminates a number sign prefixed meta-command. If no arguments are present, then no semicolon is needed, and no semicolon is allowed. Other techniques could be used to distinguish the meta-commands from the underline document commands. For example, when a template designer is using the template editor 1000, and when a template is displayed on the screen, the meta-commands could simply be set forth in a different color than the remaining printer text, or they could be highlighted, or set forth in a special type font.

A template defines a generalized document or report that includes many possible variations. Through the processing of a template and any given page of incoming information, the template is transformed into a highly customized document or report containing only a selection of the possible alternatives defined by the template and also containing specific information removed from the page of incoming information, possibly processed in some manner and converted as to format and position, and inserted into the document or report such that the resulting printed document is highly customized both in its standardized aspects, defined by the template, and also in its variable aspects, defined by the page of incoming information.

An example of a simple template is shown in FIG. 11. This template contains only five meta-commands enclosed within brackets and five meta-commands prefixed by a number sign and, if the command has an argument, suffixed by a semicolon. There are ten meta-commands in this greatly simplified template. The ellipses indicate where data to be printed and print commands may be found.

The command names enclosed within brackets break the template into sections. In some cases, these bracketed commands are followed on subsequent lines by values which relate to the preceding bracketed command. In other cases, the bracketed commands are followed by document template segments containing data to be sent to the printer, containing printer commands (such as Postscript, PCL, or Prescribe commands), and also containing other embedded meta-commands prefixed by number signs some of which mark the insertion points for variable data and others of which control the selection of optional and alternative passages and the construction of repetitive passages under the control of variable data, the variable data coming from the incoming pages received from the host.

Every set of templates must be given a project name. This is done by inserting the "[PROJECT]" meta-command enclosed within brackets at the start of the set of templates. Following this, on a separate line the name of the project appears. In FIG. 11, the project is assigned the name "Reports". In the present embodiment of the invention, this project name designation is not used. In future embodiments, provision will be made for the storage multiple projects, each containing multiple templates, within the printer or on a separate server, and meta-commands will be provided whereby any project can be designated for use by different computers and/or by different users within a networked environment.

While not shown in FIG. 11, a number of commands enclosed within brackets may follow the "[PROJECT]" command and may define global characteristics of the entire set of templates. The "[DOWNLOAD]" command can be followed by a list of file names, each on a separate line, identifying files such as graphic files that are to be transferred from the template design computer 204 into the system 100 at the same time that the set of templates is loaded into the system 100. This list of file names may be followed by other printer data, including commands such as Postscript, PCL, or Prescribe commands, that must be loaded into the system 100 to initialize the system every time the system 100 is reset or powered up. The purpose of this printer data is to allow macros, fonts, and logos to be loaded whenever the system is reset of powered up.

The "[REPLACEALL]" command can be followed by string replacement commands, each such command being set forth on three separate lines, with a first line defining the string to be searched for, the second line defining the replacement string, and the third line blank. The preferred embodiment, at present, permits up to 100 search and replace string pairs to be specified in this manner, and it would be a simple matter to expand this number by modifying the program. With reference to FIG. 7, the program module 720 performs all of these searches and replacements on every page of incoming information which is fed into the system 100. It does so in a single pass through the incoming data by searching the incoming data for the first letter of any of the up to 100 search strings and by thereby performing all of the searches at the same time in parallel, rather than performing them serially in the manner of a word processor search mechanism.

A final global command, which does appear in FIG. 11, is the "[OPTIONS]" command which is followed by a list of options for the system 100 each listed on a separate line, as is shown in FIG. 11. The options shown in FIG. 11 are set as follows: The maximum number lines permitted on an incoming page is 80. Both PCL and Prescribe printer control commands are to be preserved in the incoming pages, and other printer commands, such as Postscript commands, are to be filtered out. The exchange rate for automatic conversion of currency from Deutsche Marks into Euros is set to 1.95583. German notation for numbers is assumed, and accordingly the decimal point is a comma and the amount separator is a period, but the amount separator is not used. The number of decimal places printed beyond the decimal point is set to zero. The printer's "time out" time facility is disabled.

Other options in the preferred embodiment of the invention not shown in FIG. 11, are the following: "BUFFER=" allows the amount of memory allocated to be varied; "MAXFILE=" defines the largest permitted print file size; "POSTSCRIPT=" is a command that permits the user to specify whether or not Postscript print commands are to be saved or filtered out; "NEWLINE=" followed by one or two 2-digit hexadecimal numbers (separated by a comma if there are two 2-digit numbers) permits one to specify by decimal ASCII code what one or more ASCII commands are to be used to represent a line break; and "NEWPAGE=" similarly allows a page break ASCII command to be specified.

Other option commands are: "CRADAPT" causes isolated carriage returns to be converted into carriage returns followed by a line feeds; "LFADAPT" causes isolated line feeds to become carriage returns followed by line feeds; and "FFADAPT" causes isolated form feeds to become carriage returns followed by form feeds. These are useful to clean up globally the print outputs of some host computers to conform with PC standards.

If the computer uses double-byte encoding for single bytes flowing to the printer, "DOUBLEBYTE=YES" or "DOUBLEBYTE=NO" may be used to start the conversion of double-bytes back into normal bytes or to stop such conversion. The ASCII command sequence to start the conversion of double-bytes to single bytes is "^^" and the ASCII command to stop such conversion is "^ "; but "HEADER=" allows the system designer to define a different command to start double-byte decoding, while "TRAILER=" permits the user to define a command to stop double-byte decoding.

Each project may have any desired number of templates within that project, each template defining a separate document or report. Every template, as shown in FIG. 11, begins with the bracketed command "[FORM]" followed, on a separate line, by the full template name, in this case "Invoice". The main body of the template, which may contain printer command codes and data to be printed as well as meta-commands prefixed by number signs, is called the corpus and is prefixed by a "[CORPUS]" meta-command. In addition, any given template may contain a prolog, prefixed by a "[PROLOG]" meta-command and proceeding the corpus, and also an epilog, prefixed by an "[EPILOG]" command and following the corpus. If present, the (optional) prolog always comes first, the (mandatory) corpus is always in the middle, and the (optional) epilog is always last. Like the corpus, the prolog and the epilog portions of a template may contain embedded printer control commands and text or material to be printed, but unlike the corpus they may not contain search and replace commands and they may not contain cut and paste commands. As noted above, if a particular template is named "everyform", then that template's prolog and epilog are used with all of the other templates. This eases the system designer's work, which means he does not need to type in the prolog and epilog every time.

Optionally, any template may contain a "[TRIGGER]" command followed by, on separate lines, strings of text which, when found in an incoming page received from the host, trigger the execution of that particular template. The trigger command is optional in the case of a template named "default", since that template is triggered whenever no other template is triggered by step 806 (FIG. 8). Additionally, the embedded "#startform=<template name >" meta-command, encountered when any template is processed, sets up the designated template whose name follows the "#startform=" command to be triggered to process all subsequent incoming pages until this command is cancelled by the "#stopform" meta-command, and accordingly templates triggerable in this manner do not require their own independent trigger designations.

If a trigger is specified with no argument following the trigger name, then that trigger may appear anywhere within the incoming page residing within the doubly-filtered page buffer. The name of a trigger may also be followed by a series of backwards slashes within which may be placed line and/or column numbers designating where that trigger must appear within the incoming page to be a valid trigger. In the place of a single line number and a single column number, ranges of line and column numbers may be specified by replacing the single numbers by pairs of numbers separated by hyphens, as in the following example:

[TRIGGER]
"Frankfurt"\2–3,4–7,\30,40

Focusing upon the template document shown in FIG. 11 following the "[CORPUS]" meta-command, a template document may be long or short, and it may contain considerable matter to be printed, including print commands (such as Postscript, PCL, or Prescribe commands) directed to the command interpreter 104. In addition, the template may contain any number of embedded meta-commands each beginning with a number sign and, if a command has one or more arguments, followed by those arguments and a semicolon. Some of these meta-commands permit parts of the template document to be optional, that is, to be deleted and not sent to the printer. Other meta-commands allow for the selection between alternative parts of a template document. Yet other meta-commands permit segments of the template document to be sent to the printer repeatedly, for example, to produce a multiple line report, or to produce multiple copies of a single report. The meta-commands which perform these template editing tasks can themselves make reference to the incoming page of data, such that the incoming page of data controls the custom tailoring of the template, reducing it to a highly customized and individualized document or report that is then printed. Other meta-commands are simply space holders for information that is cut out of the incoming page and inserted into the template before the template goes to the printer, this data being retrieved from the incoming page within the doubly-filtered page buffer 705 (FIG. 7) and, in some instances, processed prior to insertion, as when: currency is transformed from Deutsche Marks into Euros.

In the exemplary template shown in FIG. 11, five illustrative embedded meta-commands are shown, but more generally a template may contain many other meta-commands and many other textual passages with embedded printer commands (such as Postscript, PCL, and Prescribe commands).

The lines of the template beginning with the "#if" command and ending with the "#endif" command are an optional passage which may be included in some printed documents or reports and excluded from others. The "#if" command sequence reads as follows:

if "Overdue"; # then

. . .

endif

Written in normal English, the above command sequence says: "if the page of text in the doubly-filtered page buffer 705 contains the word 'Overdue' then print that portion of the template extending from this '#if' meta-command down to the next '#endif' meta-command that follows (skipping past any '#endif' meta-command preceded by its own corresponding '#if' meta-command). Otherwise, if the page does not contain the word 'Overdue', then skip past this same portion of the template and do not send it to the printer."

Accordingly, the template document shown in FIG. 11 contains an "optional" passage the selection of which is controlled by the "#if . . . #endif" meta-commands which in turn are controlled by the data content of the incoming page of data being processed. While not shown in FIG. 11, the material between the "#if" and the "#endif" meta-commands may be broken into two segments by means of an embedded "#else" meta-command, and then the "#if . . . #else . . . #endif" meta-command sequence breaks the template into two alternative passages one of which is printed if the if the "#if" test is true, and the other of which is printed if the if test is false. Other permitted command structures are: "#if . . . #elseif . . . #else . . . #endif"; "#ifnot . . . #andnot . . . #elseifnot #ornot . . . #else . . . #endif"; "#if . . . #or . . . #elseif . . . #and . . . #else . . . #endif", to illustrate some of the many possible variations on the use of these commands.

The meta-command language provides for many variations on the above optional and alternative passage examples. First of all, the optional and alternative meta-command structures may be nested one within another to a considerable depth so that highly complicated ways of selecting clauses from the template to be printed may be achieved, giving a great deal of sophistication to the process of customizing documents and reports under the control of the data within a given incoming page.

The following are examples of the "#if" meta-command:

if s\m,n;

If the string s occurs in line m at column n, then insert the material that follows.

if s\n;

If the string "s" occurs anywhere within line n, then insert the material that follows.

if s;

If the string "s" occurs anywhere in the page, then insert the material that follows.

if m op n;

Here, "op" may be "=", "<>", "<", ">", "<=", or ">=". Assuming "op" to be "=", then this command says if the number n equals the number m, then insert the material that follows.

In the above examples, "s" was a string. The string can be normal characters enclosed in double quotations marks, or it may be a two-digit number which is a hexadecimal equivalent of an ASCII unprintable or printable character, or it may be a series of such two-digit numbers separated by commas. Such a string may be set forth by itself, in which case it can appear anywhere within the page. Alternatively, the string may be followed by a backwards slash which in turn is followed by either a line number by itself, or by a line number and a column number separated by a comma, or by line number and/or column number ranges, as in the example: "4–8,12–23".

In addition to the "#if" command, the meta-language also supports an "#and" command and a "#or" command which may use, as is illustrated by the following example:

if 23>(#var03*#mid 8,3) #and "operation";

Translated in normal English, this statement says: "if 23 is greater than the product of the number assigned to variable 3 multiplied by the number occupying the three character positions beginning in the $8^{th}$ column of the current line, and if the page contains the string "operation", then insert the material that follows."

In addition to the "#if" meta-command, the meta-language supports an "#elseif" meta-command, an "#ifnot" meta-command, and an "#elseifnot" meta-command. In addition to the "#and" and "#or" meta-commands, the language supports, an "#andnot" meta-command and a "#ornot" meta-command. These are implemented in ways similar to the commands that were described just above.

Repetitive passages in a template are passages that may be replicated and inserted into a document or report multiple times. Sometimes this is done to make multiple copies of a document or report with possibly some variations between them. At other times, entirely different documents are formulated from each replication of that portion of the template. And, of course, if a variable-length tabular financial report is generated, then each line in the tabular report can be defined by a single line in the template document that is replicated as many times as are necessary. It even may be necessary to embed one repetitive passage within another, as when multiple lines of a report appear on multiple pages of the report. Each page may be defined by an outer replicated portion of the template, and each line may be formed by an inner replicated portion of the template proceeded by a page header and followed by a page trailer.

Each such replicated portion of a template is proceeded by the embedded meta-command "#for n;" where "n" is a number indicating the number of replications. "n" could be a number extracted directly from the incoming page that is controlling the printer, or "n" could be computed in some manner from such data. It is also possible to set "n" to a very large number so that the passage is replicated repeatedly until some other mechanism terminates the replication process. Each such replicated portion is followed by an embedded meta-command "#next". Accordingly, all such passages appear as follows:

. . .

for #mid8,10;

. . .

next

. . .

The above example selects as the controlling repetition count value the number positioned in the ten-character-wide window starting at the eighth character position in the current line of the incoming page.

If the repetition counter is set to a very large number, then some other mechanism is needed to stop the template portion replication process. Accordingly, a "#goto "<name>;" meta-command is provided to allow jumping out of such a replicatable template portion to a point beyond the end of the replicatable portion where a "#label="<name>"" meta-command can define a label for the point at which template processing is to resume. An "#if . . . #goto . . . #endif" meta-command structure, embedded within the "#for . . . #next . . . #label" structure can be used to perform some form of test to determine whether or not to jump and terminate the replicative process. For example:

. . .

for 9999999;

. . .

if ""\10;

goto "loopend";

endif next label "loopend";

. . .

The "#goto" statement may also be used in other ways to jump around within a template and also to create multiple copies of documents and reports.

The meta-command "#retain" (which cancels the printing of a page) and the meta-command "#pass" (which forces the printing of a page even following an occurrence of the "#retain" meta-command) may also be used in conjunction with the "#if . . . #endif" meta-commands to determine whether information extracted from a given incoming page is to be printed or discarded. Another command controllable by "#if . . . #endif" is the "#serial" meta-command which causes the data output by the meta-command interpreter 108 to be diverted away from the data path 778 that leads to the print engine 102 and to be diverted instead to a serial port output of the printer (which may not be available on all printers). This diversion of the data is terminated by a "#quit" meta-command. This pair of meta-commands is useful for diagnostic purposes. Future versions of the system will permit diversion to even other devices, for example, back into the network to a device having a network address or over an internet to a device having an IP address, using the TCP protocol.

The "#corpus" and "#epilog" meta-commands are specialized forms of the "#goto" meta-command. The first jumps right to the "corpus" portion of the template, and the second jumps directly to the "epilog" portion of the template. These commands, when nested within an "#if . . . #endif" command sequence within a "#for . . . #next" command sequence, may also be used to terminate a repetitive replicative operation.

Normally, the process of executing a template is triggered by trigger commands defined for each template, and if no such trigging word is found, a template named "default" is triggered by default or, if no such template exists, then no template is processed for that particular incoming page. During the execution of a template, an embedded "#startform "s";" meta-command may be executed which, from then on, causes a particular template named "s" always to be triggered by the step 802 (FIG. 8) which overrides the other triggering mechanisms within the system 100. This operation continues until an "#endform" meta-command is processed which terminates this alternative triggering mechanism and suppresses step 802.

The remaining meta-commands all relate to addressing the incoming page of data within the doubly-filtered page buffer 705 (FIG. 7) to select a row and/or a column, to specify how many characters are carved out of the page, and to specify how that information is to be edited or otherwise processed before being added to the output flow of data over the data path 778 flowing to the printer, or before being used as an argument to one of the meta-commands, such as the "#if" meta-command, to control the selection of optional and alternative passages and the replication of repeatable passages.

The data within the page buffer 705 has already been pre-filtered to remove any undesired printer control commands that may have been placed there by the host. The data is arranged into rows and columns, with one character at: the intersection of each row with each column. In addition, the meta-command interpreter 108 maintains an internal default specification of which row and which column are the "current" row and column to be used by some meta-commands, by default, if no other row and/or column is specified by the command's arguments. Accordingly, the first set of meta-commands that relate to the reading of data from the page buffer 705 are those that allow adjustment of the default row and column counters.

The command "#line=2;" allows the default row number or line number to be adjusted. The command "#col=23" allows the default column number to be adjusted. The command "#incl" allows the default line number to be incremented, while the command "#decl" allows the default line number to be decremented. Similarly, the command "#incc" allows the column number to be incremented, while the command "#decc" permits the default column number to be decremented. The command "#subc n" permits the default column number to be decremented by a value "n", while the command "#addc n" permits the column number to be incremented by a value "n". Similar commands "#addl n" and "subl n" permit row or line numbers to be incremented and decremented. The commands "#lastl" and "#lastc" respectively permit the default line number and column number to be set to the last line or last column of the incoming page of information.

To provide for temporary storage of line and column numbers, two software stack type storage areas (last in, first out) are provided along with the meta-commands "#pushl", "#popl", "#pushc", and "#popc".

Another internal counter within the meta-command interpreter 108 maintains a count of the pages being sent to the printer. A reference to the current page number may be inserted into the output by use of the meta-command "#pagenr". This page number counter may also be set by providing a numeric argument, as in the example "#pagenr= 1;". The page number counter may be incremented and decremented by the respective commands "#incpa" and "#decpa". This affords the possibility of different processing of even and odd page numbers, as well as page numbering.

Another set of meta-commands permit material to be inserted into the output stream which flows to the printer.

The command "#include "<template name>";" incorporates another template into this template. The command "#file "<filename>"; " loads a preloaded printer file, such as a graphics image, directly to the printer for printing so that bit maps do not have to be included within the templates. The command "#blank 6;" inserts 6 blanks spaces into the output. The command "#chr 11" inserts the 11$^{th}$ character, symbol, or command in the ASCII character set into the output, in this case the "vertical tab" command. The command "#nl" inserts a line break into the output flow of data, while the command "#np" inserts a page break. The command "#totalbin" inserts the entire source page as a unit into the output with no editing, while the command "#totalp" inserts that same output page stripped of printer control codes into the output flow. The command "#tab 5" inserts 5 tab characters into the output flow. The command "#replace s,s;" causes a first string "s" to be replaced with a second string "s" in the current line of the input page. The command "#beep" causes the printer to beep (when that feature is available on the printer).

The following printer commands enable information to be carved out of the current incoming page of data within the doubly-filtered page buffer 705 and to be either transferred to the printer, if the command stands by itself, or used an argument for some other command, if this command is so positioned to be an argument to the other command.

The command "#left 8;" selects the left-most 8 characters in the current line. Likewise, the command "#right 8;" selects the right-most 8 characters. The command "#mid8, 10;" selects 10 characters starting at the 8$^{th}$ character position in the current line. The command "#from 8;" selects the left side of the current line, starting at the 8$^{th}$ character position and continuing to the end of the line. The command "#full" selects the entire current line. Any of the above commands, with the letter "cr" added to the end of the command name, performs as described above but also outputs a line break to the printer along with the data. The additional command "#fullcr 22–26;" selects lines 22 through 26 with a line break following each line for transmission to the printer. Likewise, the command "#fullcrnz 28–35" selects lines 28–35 to be fed to the printer with a line break following each line, but only if the lines contain data.

The next meta-commands perform some editing upon the results of some other command having carved data from input document or having computed some value in some way.

The command "#rfix n,c;" forces the data unit "c" to have "n" characters, with "c" right-shifted. If "c" is too big, it is cut on the left. If too small, then spaces are added to the left. A similar command "#lfix n,c;" forces "c" to have "n" characters, with "c" left-shifted. If "c" is too big, it is cut on the right. If too small, then spaces are added to the right. The command "#cfix n,c;" forces the character string "c" to have "n" characters, centered. If "c" is too big, it is cut on both the left and the right. If "c" is too small, then spaces are added to both the left and right to achieve the desired length.

The command "#ucase c;" reformats the string or expression "c" in uppercase only. The command "#lcase c;" reformats the following expression or string in lowercase only. The command "#nz c;" reformats the following expression by deleting it if there are no characters present and otherwise by passing it on. The command "#fill sb;", where "sb" is a single byte string such as "42" or "*," alters the operation of the "#rfix", "#lfix" and "#cfix" commands so that the filling is done with "*" or whatever other character specified by the "#fill" command, rather than with blanks.

Three trim commands are provided for stripping away blanks from a character string. The command "#ltrim c;" trims away blanks from the left side; the command "#rtrim c;" trims away blanks from the right side; and the command "#lrtrim c;" trims away all blanks from both the left and the right sides of a character string or expression "c".

As an example of the type of computational operations which can be provided, the "#euro c;" command assumes the character string or number "c" is a currency amount expressed in Deutsche Marks and converts it into a currency amount expressed in Euros. Other similar currency operators could easily be added, for example, to convert other European currencies into Euros, or Euros into Dollars, or Dollars into Euros, or whatever is required.

Template arguments and values for insertion may also be variables. It is proposed to represent variables as "#var01", "#var02", and so on. The following expressions would then be permitted in any template:

var01=20;

var02=#var01;

var03=#mid 3,46;

var04+=1;

var05=#var01+50;

str01="hello";

str02=#lcase(#str01+#mid 3,46);

A portion of a template set may be defined as a "[FUNCTION]" rather than as a "[FORM]". These portions may then be automatically executed, or incorporated by reference, into other templates, by means of a "#call <function name >;" meta-command.

Templates may be created with the assistance of a template. editor 1000 that is shown in block diagram form in FIG. 10 of the drawings. The template editor contemplated by the present invention includes two window program objects each having associated therewith a program module plus a display window. At step 1002, a graphics editing window contains an image of the page of information that it is desired to have the printer actually print. This information may come from a number of sources. Preexisting form documents or reports may be scanned in, at step 1006, or images can be created with any suitable graphics editor all by scanning and by converting into "TIFF" files at step 1008. Using conventional desktop publishing software, these files may be combined and integrated into a file suitable for printing and containing Postscript or PCL or Prescribe commands at step 1010, and then the files may be stored at 1012 in the form of a printer file image of the desired report, complete with text, graphics, and printer control commands, and lacking only the meta-commands that specify the optional and alternative portions, the repetitive portions, and the points where information of a variable type is to be inserted. Alternatively, a drafting utility such as a programmer's editor or a normal text editor may be used to create directly a print command file at step 1014, and this file may be stored at 1016. However the report file is created, it is then called up and displayed in the graphics editing window as an image of the desired report, document, or form, at step 1002.

Next, the legacy printer data output by the host computer 134 is captured 1003 and, at step 1004, is displayed in a text editing window with the printer escape codes stripped out of the page of information so that only the printable characters are visible in a rectangular array. This data may be captured by feeding the host data 134 directly into a personal computer that can capture and store this data, or perhaps the host computer 134 can pass its printer data directly into a file.

The system designer, viewing both the desired document or report in the window created by step 1002 and viewing the host computer data displayed in the window created by step 1004, can now highlight portions of the page of information from the host, drag it across with a mouse, and drop it in the appropriate place within the graphics editing window 1002 to show how the host data is to be transferred into and positioned within the desired formal report (step 1018). At the same time, any necessary processing of that data can be specified, such as "all capitalization" or "strip off blanks, center, and pad with spaces to a certain length" and other such requirements, through the use of a series of windowing question and answer templates.

When the desired template is to have optional and alternative passages, and passages to be replicated, these passages may be highlighted within the window created by the step 1002, and then appropriate pop-down menus can first select the desired bracketing meta-commands "#if . . . #endif", "#if . . . #else . . . #endif", or "#for . . . #next" (etc.) and then answer pop-up questions to define what is to control the selection and the replication process.

After having thus interactively gathered all the necessary information about how the template is to be constructed, the next step is for the template editor 1000 to build a template command set containing the data, the Postscript, PCL, or Prescribe commands, and also the meta-commands (step 1020). Optionally, the template editor can then run a simulated "execution" of the template against the host data visible in step 1004 data so that the system designer can see exactly what reports are generated and can have an opportunity to modify or correct the template while it is visible in graphic form. Finally, when the system designer approves all of the templates in a given set, it is safe to save the set to disk at step 1022, at which point the template set appears essentially as shown in FIG. 11.

Alternatively, the template set such as that shown in FIG. 11 may be created directly with any word processor or with a programmer's text editor. The system designer may also touch up or revise a template manually using a text editor.

After a template set is created and before it may be fed into the system 100, it is desirable to do a considerable amount of preprocessing on the template set so as to reduce the volume of data that needs to be transferred into the template storage 110 and also to simplify the template's structure, for example, by substituting numbers for meta-command names, and by storing strings and expressions in tree data structures, to reduce the complexity of the meta-command interpreter 108 and thereby facilitate storage of the template set in a small read only memory associated with a printer. These steps are carried out by the template compiler 300 shown in FIG. 2 residing within a personal computer 104 such that the templates are compiled, or compressed, before they are fed into the template storage area 110 within the system 100.

The details of the template compiler are disclosed in block diagram FIGS. 3 through 6 which will be described next.

When the operator requests the compilation of a set of templates for transfer to and storage within the system 100, the template compiler 300 begins at step 302 by locating and inserting into the template set definition any "#include" files to expand the template to full length. Next, any needed printer files, such as graphic files, referred to in the template set by the "#files=" meta-command, are located and are prepared for transmission to the System 100 as part of the template set of data (step 304).

Next, at step 306, the set of templates (FIG. 11) is scanned line by line. If an error is detected at step 308, program control jumps to step 404 in FIG. 4 where an error message is displayed, and then at step 406 an error file is created with error comments inserted following each incorrect line to aid the system designer in repairing the problems. The types of errors detected are those normally detected by compilers and interpretive processors, such as syntax errors, out-of-range values, an "#if" statement without a matching "#endif" statement or a "#for" statement without a matching "#next" statement, or misspelled or unrecognizable operator names, or operators without the proper number and types of arguments, etc.

If there are no errors in a line, then at step 310, the command names and template names are converted into numbers. At step 312, all strings found within the template are stored into a control file string table and are replaced with string and index number references, and the length of each string is also saved in a special table. At step 314, any trigger names are saved as strings stored in a special trigger string table towards the head of the output data to be readily found and used by the meta-command interpreter 108. System strings are also saved (step 316). This process continues repetitively, line by line, until the last line of the template set is encountered at step 318, at which point program control continues in FIG. 4.

At step 402, a complete consistency check of the entire set of templates is conducted, and again any errors found produce a display of an error message, and appropriate comments are inserted into an error file. If the consistency check is passed, then at step 408 the forward references of "#goto" and "#startform" statements and the like are carried out by another pass through the template data.

Figure 5:
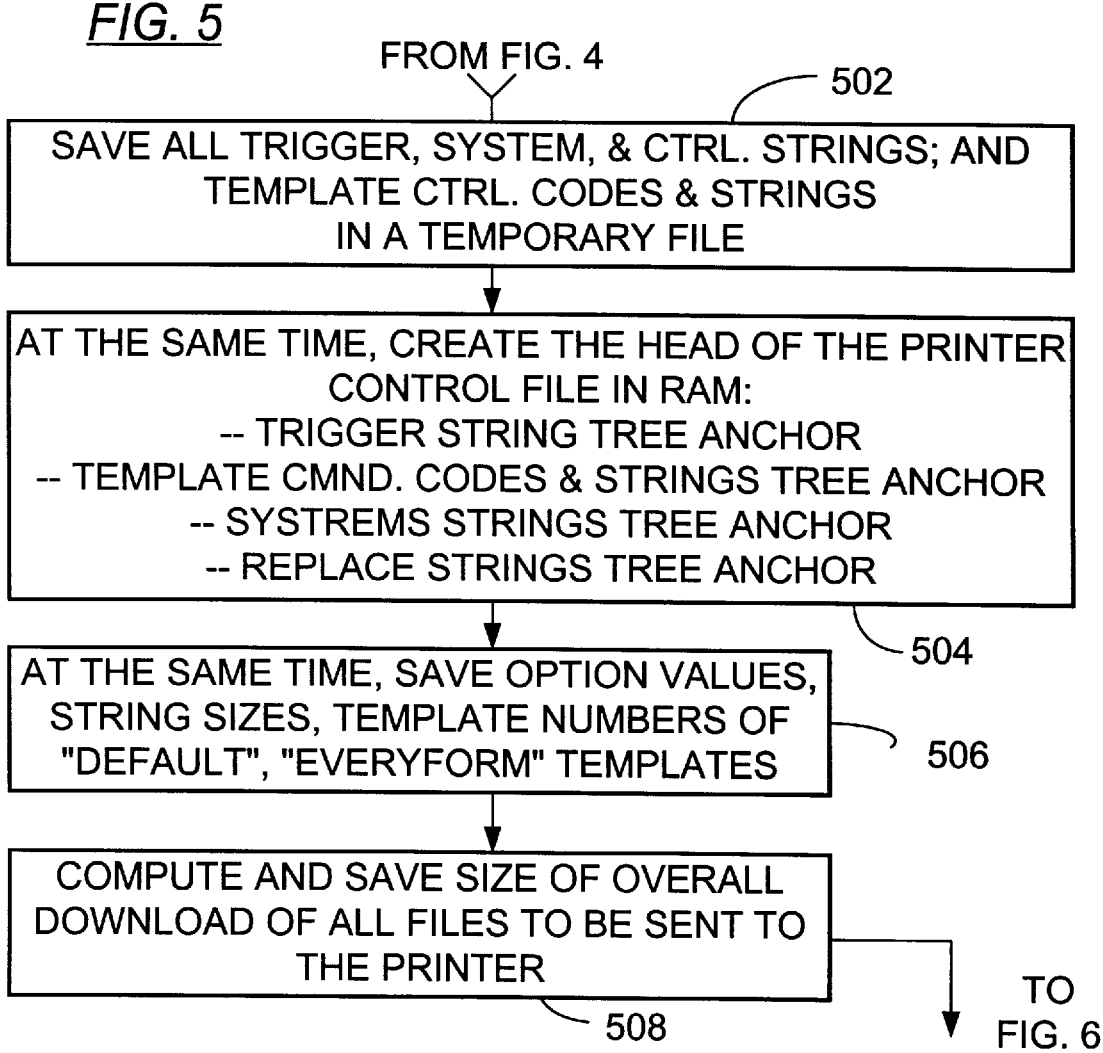

Turning now to FIG. 5, step 502, all of the trigger strings, system strings, control strings, and form control codes and strings for all of the templates are stored in a temporary file together. And, at the same time, step 504 creates at the head of this printer control file: a trigger string anchor point which points to the linked list of all the trigger strings, each pointing to the triggering string of characters, to the corresponding template number, and to data identifying where that trigger string must be positioned within an incoming page; a tree anchor that is linked to a list of all of the template names and that, for each template, points to where the corresponding compressed template control command string, such as that shown in the last 12 lines of FIG. 12, is stored; an anchor for a data tree that points to system-related strings which are to be processed by functions, and also identifying the corresponding functions; and an anchor for a tree identifying the replacement strings specific to templates.

The idea here is, at the same time, and with one pass through the data, to place all of the varying length strings of all types into the temporary file at step 502 and to create a complete pointer directory header with anchor points within RAM memory at step 504.

Next, the option table values (for example, see the last nine lines of FIG. 11) are stored as part of the printer control file header. These are followed by a table of values identifying the sizes of the various strings. (The compressed templates are terminated by "AAAA", so their length does not have to be recorded). Finally, the template numbers of any template named "default" and of any template named "everyform" are recorded, or if absent, are represented by "−1" (step 506). At step 508, the size of the overall download of all the information that is to be sent to the system 100 is computed and is saved in the same data file header structure. At this point (not shown in the figure), for particular printers, when the file is created by particular PCs, the byte ordering of the words of data may have to be altered, since the ordering of the bytes in a data word (which byte in a word comes first in a file) may be different in the printer than it is in the personal computer that is creating the file, and thus may need adjustment.

Figure 6:
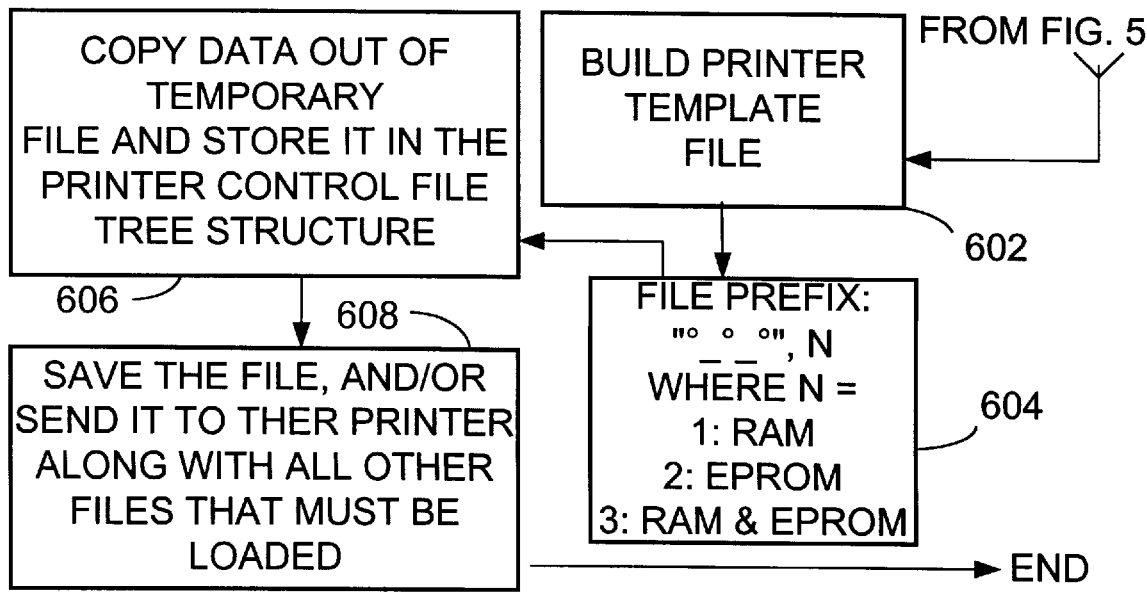

Referring now to FIG. 6, at step 602, a printer template file is built and is generally constructed as is shown in the somewhat simplified in FIG. 12. At step 604, at the beginning of this file, the necessary prefix string "°_°_°" followed by 1, 2, or 3, are added to the front of this file.

The header data just created is now combined (step 606) with the string data which is now pulled out of the temporary file and stored in the printer control file as a complex tree structure. Then, at step 608, the header plus all of the data, constituting the compressed set of templates, is saved as a single file, or is sent off to the system 100 along with the other files that were identified as necessary for this set of templates by embedded "#files=" meta-commands. The compressed templates are stored in the template storage area 110, and then the system 100 is ready to begin processing.

In the preferred embodiment of the present invention, a standard printer is used, and both the meta-command interpreter, written in the language "C" and compiled into the native language of the microprocessor within the printer, are stored on a PCMCIA EEPROM along with the stored templates, as is shown in FIG. 2. Alternatively, one or the other of the meta-command interpreter and the templates could be stored on a hard disk drive associated with the printer or stored within a read only memory that is plugged directly into the printer. As another alternative, the meta-command interpreter could be enclosed within a ROM provided with its own microprocessor, together with sufficient memory to store the template documents, and these could be housed on a card that is plugged into the printer to function as a "pre-processor" of data before it reaches the printer, which is then unmodified. As another alternative, all the data passing to the printer could be passed through a box containing a microprocessor, a ROM containing the meta-command interpreter, and also programmable EEPROMS containing the templates, and the box could be incorporated into a printer cable leading to any desired standard printer. In either of the latter two cases, the meta-command interpreter would be compiled into the language of its own microprocessor and would not have to be compiled into the language of each unique microprocessor associated with each unique printer. It is also possible to incorporate the meta-command interpreter and the template storage area into a personal computer which could then be interposed between a network connecting to other computers and a standard printer, and then all of the processing described in this patent could be performed as a pre-processing step within the personal computer before the data reaches the printer.

The Appendix which follows presents illustrative portions of the "C" language source code program that was used in constructing the meta-command interpreter. The first short sequence of code tests an array of 128 trigger locations which are non-zero if the corresponding trigger was found within the input page. Whenever a non-zero value is found, the subroutine "use_template" (or template processor) is called to process the corresponding template.

The subroutine "use_template." is also set forth in the Appendix. It scans the compressed template (see the last ten lines of FIG. 12), finding meta-commands (in FIG. 12, identified by the numbers "0E", "39", "02", "07", and "0F", calling the corresponding subroutines whose addresses are stored in the array "beftab" (also shown in the Appendix) to process each meta-command. For example, when "use_template" encounters the meta-command number "0E" (hexadecimal) or "14" (decimal) corresponding to the "#if" meta-command, it calls the $14^{th}$ subroutine in the array "beftab" which is "command_if", as can be seen in the Appendix, to process the "#if" meta-command's arguments and to then either include or exclude optional and alternative portions of the template.

The subroutines for two typical meta-commands are set forth in the Appendix. The first is the subroutine "command_mid" which executes the "#mid" meta-command, described above, that carves characters out of the middle of a line of the incoming page in the doubly-filtered page buffer 705.

The second is the subroutine "command_if" which, as just explained, processes the "#if" meta-command. The inserted English language comments explain the operation of these subroutines. Briefly summarized, a false test result for "#if" causes all meta-commands to be skipped until some form of "#else" or "#endif" meta-command is found. Otherwise, a flag is set and saved in a pushdown stack "if _status", and command execution continues normally until an "#else" is encountered, at which point all meta-commands are skipped until an "#endif" is found. If no "#else" is found before the "#endif" is found, then all subsequent meta-commands are executed. Of course, "#if . . #else . . #endif" nested command sets must be skipped (when skipping) or processed (by a call to "command_if", for example) when not skipping. The "#if" statement nesting level is "nesting_depth" which is used as an index into the array "if_status".

The search for a matching string within the incoming page, used as part of the "#if" meta-command truth evaluation, is performed by a subroutine test_whether_ true", also set forth in the Appendix.

The subroutines set forth in the Appendix illustrate how the meta-commands are selected, how individual meta-command execution subroutines are called, how data is retrieved from the input page, and how comparison searches are performed, thus illustrating with actual source code examples how one goes about constructing the heart of a meta-command interpreter.

APPENDIX

```
/* Scan all triggers and test which triggers occurred. Call "form
    maker" ("use_template") to interpret all the commands in the
    corresponding template. */
for (frmnum=0;frmnum < 128;frmnum++) {
    if (*p2 != 0) {
        gewtopic=1;
        use_template();
        letzte_seite_war_template=1;
    }
    p2++;
}
```

APPENDIX-continued

```c
/* Main command interpreter. Executes all commands found within a
    document template. */
void use_template(void) {
    ushort i;
    ushort *repl_p;
    SUTAB *st;
    char *p1,*p2,*p3;
    gewzeilennr=0;
    wunschzeile=0;
    wunschspalte=0;
    trimbyte_akt=trimbyte_fix;
    fillbyte_akt=fillbyte_fix;
    zeilenspeicher_p=zeilenspeicher_adr;
    zielbeginn_dieses_templates=druckspeicher_p;
    if(tab_replace_anzahl[frmnum] != 0) {
        templatesuers_vorbereiten(frmnum);
        suers_auf_templateebene();
        zeilenangaben_erneut_feststellen();
    }
    retain_occurred =1; /* set "do print" flag */
    formkopien=1;
    drucksp_vor_template_p=druckspeicher_p;
    vorgekommene_labels=0;
    zeilenspeicher_p=zeilenspeicher_adr;
    /* set pointer to point at first command of the template */
    formdaten_akt=
    (char *) (tab_offsets_der_template_adr[frmnum]);
    topic_akt=1;
    templateschluss_flg=0;
    /* Scan the operators */
    while(1) {
        gewbefehl=*(ushort *)formdaten_akt;/* Fetch the next
                            command number */
        formdaten_akt + = 2;
        /* Quit if command is "AAAA" */
        if((gewbefehl= =0xAAAA) || (templateschluss_flg= =1)) {
            templateschluss_flg=0;
            break;
        }
        if(topitwarten_flg!=0) {
            AL_beftab[gewbefehl]();
            if(gewtopic= =topic_akt) {
                topicwarten_flg=0;
            }
        } else {
            /* back up the command subroutine in table and call the
                command subroutine */
            beftab_akt[gewbefehl]();
        }
    }
    topicwarten_flg=0;
    /* complete the size of the output data sent to output print
            buffer */
    resultbytes=
    (ulong)druckspeicher_p-(ulong)zielbeginn_dieses_template;
    /* If "do print" flag is still "1", means there was no
        "retain" command, then print the date */
    if(retain_occurred= =1) {
        /* increase size of data to be printed */
        druckbytes+ =resultbytes;
    } else {
        /* reset the output pointer to the beginning of the output
            print buffer */
        durckspeicher_p=drucksp_vor_template_p;
    }
}
typedev void (*PROUTBEFEHL)();
PROUTBEFEHL beftab[200]; /* 200 possible command number */
PROUTBEFEHL *beftab_akt;
    /* Assignment of subroutines for each command to an index
        number */
    beftab[0]  = &command_left;
    beftab[1]  = &command_right;
    beftab[2]  = &command_mid;
    beftab[3]  = &command_from;
    beftab[4]  = &command_full;
    beftab[5]  = &command_blank;
    beftab[6]  = &command_string;
    beftab[7]  = &command_nl;
```

APPENDIX-continued

```
beftab[8]  = &command_np;
beftab[9]  = &command_totalbin;
beftab[10] = &command_tab;
beftab[11] = &command_string;
beftab[12] = &command_totalasc;
beftab[13] = &command_replace;
beftab[14] = &command_if;
beftab[15] = &command_endif;
beftab[16] = &command_elseif;
beftab[17] = &command_else;
beftab[18] = &command_lfull;
beftab[19] = &command_lfrom;
beftab[20] = &command_lmid;
beftab[21] = &command_lleft;
beftab[22] = &command_lright;
beftab[23] = &command_rfrom;
beftab[24] = &command_rfull;
beftab[25] = &command_rmid;
beftab[26] = &command_rleft;
beftab[27] = &command_rright;
beftab[28] = &command_lrfrom;
beftab[29] = &command_lrfull;
beftab[30] = &command_lrmid;
beftab[31] = &command_lrleft;
beftab[32] = &command_lrright;
beftab[33] = &command_rfix;
beftab[34] = &command_lfix;
beftab[35] = &command_cfix;
beftab[36] = &command_retain;
beftab[37] = &command_pass;
beftab[38] = &command_label;
beftab[39] = &command_goto;
beftab[40] = &command_for;
beftab[41] = &command_next;
beftab[42] = &command_seriel;
beftab[43] = &command_quit;
beftab[44] = &command_totalp;
beftab[45] = &command_fullcr;
beftab[46] = &command_fullcrnz;
beftab[47] = &command_corpus;
beftab[48] = &command_trenner_prolog_corpus;
beftab[49] = &command_epilog;
beftab[50] = &command_trenner_corpus_epilog;
beftab[51] = &command_startform;
beftab[52] = &command_endform;
beftab[53] = &command_ucase;
beftab[54] = &command_nz;
beftab[55] = &command_trim;
beftab[56] = &command_lcase;
beftab[57] = &command_cline;
beftab[58] = &command_incl;
beftab[59] = &command_decl;
beftab[60] = &command_addl;
beftab[61] = &command_subl;
beftab[62] = &command_fill;
beftab[63] = &command_ccol;
beftab[64] = &command_incc;
beftab[65] = &command_decc;
beftab[66] = &command_addc;
beftab[67] = &command_subc;
beftab[68] = &command_break;
beftab[69] = &command_ifnot;
beftab[70] = &command_elseifnot;
beftab[71] = &command_pushl;
beftab[72] = &command_popl;
beftab[73] = &command_pushc;
beftab[74] = &command_popc;
beftab[75] = &command_lastl;
beftab[76] = &command_lastc;
beftab[77] = &command_ltrim;
beftab[78] = &command_rtrim;
beftab[79] = &command_lrtrim;
beftab[80] = &command_euro;
beftab[81] = &command_and;
beftab[82] = &command_or;
beftab[83] = &command_beep;
beftab[84] = &command_andnot;
beftab[85] = &command_ornot;
```

APPENDIX-continued

```c
/* #MID command: carve out data from the middle of a line of the
    doubly-filtered printer page buffer and send it to the output
    print buffer */
void command__mid(void) {
    command__vorbereitung();
    kopierlaeng=0;
    gewzeilennr=*(ushort *)formdaten__akt;
    formdaten__akt + = 2;
    if(gewzeilennr= =0xFFFF) gewzeilennr=wunschzeile;
    if (gewzeilennr > seitenzeilen__m__1) {
        formdaten__akt + = 4;
        command__nachbereitung();
        return;
    }
    gewmidlaenge=*(ushort *)formdaten__akt;
    formdaten__akt + = 2;
    gewmidoffset=*(ushort *)formdaten__akt;
    formdaten__adkt + = 2;
    if(gewmidoffset= =0xC000) {
        gewmidoffset=wunschspalte;
    } else if (gewmidoffset= =0xE000) {
        gewmidoffset=zeilenlaenge[gewzeilennr]-1;
    }
    if((gewmidoffset) > = zeilenlaenge[gewzeilennr]) {
        command__nachbereitung();
        return;
    }
    if(gewmidlaenge > (zeilenlaenge[gewzeilennr]-gewmidoffset))
        gewmidlaenge = zeilenlaenge[gewzeilennr]-gewmidoffset;
    if(gewmidlaenge= =0) {
        command__nachbereitung();
        return;
    }
    kopierlaenge=gewmidlaenge;
    /* copy the date to the output buffer */
    memcpy(kopiersceicher__p,zeilenoffset[gewzeilennr]
        + gewmidoffse,t(size__t) gewmidlaenge);
    kopiersceicher__p + = gewmidlaenge;
    command__nachbereitung();
}
/* #IF command subroutine */
void command__if(void) {
    if__umkehr=0;
    verarbeitung__if();
}
/* #IFNOT command subroutine */
void command__ifnot(void) {
    if__umkehr=1;
    verarbeitung__if();
}
/* #IF and #IFNOT execution subroutine */
void verarbeitung__if(void) {
    ushort iftyp;
    if(if__status[nesting__depth]= =0)
    {
        iftyp=*(ushort *)formdaten__akt;
        formdaten__akt + = 2;
        /* Perform string compare to test for TRUE or FALSE */
        test__whether__true();
        /* increment the if statement nesting level */
        nesting__depth+ +;
        /* if "#IF" and "TRUE" or "#IFNOT" and "FALSE" */
        if((trifft__zu ^ if__umkehr) = = 1)
        {
            /* Execute to "#else" */
            if__status[nesting__depth]=0;
            if(goto__aktiv= =0)
                beftab__akt=beftab;
            else
                beftab__akt=AL__beftab;
        }
        /* Otherwise "#IF" and "FALSE" or "#IFNOT" and "TRUE" */
        else
        {
            /* Skip to "#ELSE" */
            if__statue[nesting__depth]=1;
            /* When the next meta-command is not #or/#ornot */
            if ((*(ushort *)formdaten__akt != 82) &&
                (*(ushort *)formdaten__akt != 85))
```

APPENDIX-continued

```
            {
                /* Ignore the following command */
                beftab_akt=AL_beftab;
            }
        }
    }
    else
    {
        formdaten_akt + = 8;
        /* Increment the #IF statement nesting level */
        nesting_depth+ +;
        /* Set the #IF level status to 2 "if" control variable
            stored for each nesting level */
        if_statue[nesting_depth]=2;
        beftab_akt=AL_beftab;
    }
}
/*
"if" control variable (stored for each "if" statement nesting level):
        if_status = 0: Execute until #ELSE, #ELSEIF or #ENDIF occurs.
        if_status = 1: The last #IF question was FALSE. Wait for #ELSE or
                    #ELSEIF and then execute again.
        if_status = 2: Wait for an #ENDIF - Skip all operators and
                    discard them.
Current nesting level = nesting_depth
*/
/* Search data for a matching string */
void test_whether_true(void) {
    ushort beginnpruefpos,ii,ii1,ii2,stn,pos,stl;
    ushort zu_vergleichende_zeilen;
    ushort zei,zei_akt,za;
    ushort zu_pruefende_positionen;
    char *p1,*p2,*p3,*stp;
    stn=*(ushort *)formdaten_akt;
    formdaten_akt + = 2;
    zei=*(ushort *)formdaten_akt;
    formdaten_akt + = 2;
    pos=*(ushort *)formdaten_akt;
    formdaten_+ = 2;
    stl=tab_laenge_der_strings[stn];
    stp=tab_offsets_der_strings[stn];
    /* Test; must we search all lines */
    if(zei= =0x8000) {/* Yes */
        zei_akt=0;
        zu_vergleichende_zeilen=seitenzeilen;
    } else {/* No */
        if(zei= =0xC000) {/* Search the current line? */
            /* Test if the line number is too big then quit */
            if (seitenzeilen_m_1 < wunschzeile) {
                trifft_zu=0;
                return;
            }
            zei_akt=wunschzeile;
        } else if(zei= =0xE000) {/* Search the last line */
            zei_akt=seitenzeilen_m_1;
        } else {/* Search the specified line */
            if (seitenzeilen_m_1 <zei) {
                trifft_zu=0;
                return;
            }
            zei_akt=zei;
        }
        zu_vergleichende_zeilen=1;
    }
    /* Test: must we search all columns? */
    if(pos= =0x8000) {/* Yes, search all columns */
        beginnpruefpos=0;
    } else {
        if(pos= =0xC000) {/* Search the current column */
            beginnpruefpos=wunschspalte;
        } else if(pos= =0xE000) {/* Search the last column */
            beginnpruefpos=zeilenlaenge[zei_akt]-1;
        } else {/* Otherwise search the specified column */
            beginnpruefpos=pos;
        }
        zu_pruefende_positionen=1;
    }
    /* Loop throught the number of lines to be searched */
    for *ii=0;ii<zu_vergleichende_zeilen;ii+ +) {
```

APPENDIX-continued

```
        za=zeilenlaenge[zei_akt];
        if(pos= =0x8000) {
            if( stl > za ) goto nicht_diese_zeile;
            zu_pruefende_positionen=za-stl+1;
        } else {
            if( (beginnpruefpos + stl) > za )
                goto nicht_diese_zeile;
        }
        p1=
        (char *)((ulong)beginnpruefpos +
        (ulong)zeilenoffset[zei_akt]);
        /* Loop through the number of columns to be checked */
        for(ii1=0;ii1<zu_pruefende_positionen;ii1++) {
            if(*p1 != *stp) goto nicht_diese_position;
            p2=p1;
            p3=stp;
            /* Compare two characters. If compare fails jump */
            for(ii2=0;ii2<stl;ii2++) {
                if(*p2 != *p3) {
                    goto nicht_diese_position;
                }
                p2++;
                p3++;
            }
            /* Successful match */
            trifft_zu=1;
            return;
            nicht_diese_position:
            p1++;
        }
        nicht_diese_zeile:
        zei_akt++;
    }
    /* No match found */
    trifft_zu=0;
}
```

While the preferred embodiment of the present invention has been described, it will be understood by those skilled in the art that numerous modifications and changes may be made without departing from the true spirit and scope of the present invention. Accordingly, it is intended by the appended claims to define the invention precisely.

What is claimed as new and desired to be secured by Letters Patent of the United States is:

1. A programmable data analyzer, and report generator, and printer comprising:

a print engine capable of printing text and graphics in response to printer engine control signals;

a print command language interpreter operatively connected to and controlling said print engine and causing said print engine to create and to print images by interpreting print commands and by then generating a set of printer engine control signals that correspond to the functions called for by said interpreted print, commands;

a data input port;

a data switch normally connecting said data input port to said print command language interpreter such that print commands presented to said input port are executed by said print engine;

a digital information memory;

a template sensor connecting to said data input port and causing said data switch to route document and report templates containing meta-commands into said data information memory;

a template-related data sensor connecting to said input port and causing said data switch to route data corresponding to one of said stored templates to a meta-command interpreter;

a meta-language interpreter connecting to said data switch to receive incoming data and to retrieve from said memory the template corresponding to said data, and acting under the control of the meta-commands within said template together with at least some of said incoming data, extracting selected data from said incoming data, combining said selected data with selected printer control commands from said selected template, and passing the data and print commands to said print command language interpreter;

whereby customized documents or reports may be printed out by said printer containing data selected from data flowing into said input port and combined with print commands selectively taken from said template, the document or report customization process and the data selection process controlled by the meta-language commands in said template together with at least some of said incoming data.

2. An analyzer, generator, and printer in accordance with claim 1 wherein the templates contain printer commands intermixed with meta-language commands, wherein at least some of the meta-language commands are distinguishable by being prefixed with a special symbol, and wherein the meta-language interpreter responds to the special symbol by parsing and executing all such meta-language commands.

3. An analyzer, generator, and printer in accordance with claim 2 wherein the special symbol is the # symbol used as a prefix for at least some of the meta-commands.

4. An analyzer, generator, and printer in accordance with claim 2 wherein the meta-language interpreter causes certain meta-language commands found in a template to be considered space holders that are removed and replaced with selected data extracted from the incoming data corresponding to said template, while the interpreter causes other meta-language commands to be treated as commands which replicate, remove or otherwise modify the data and printer control commands in the template, thereby reducing the template to a set of intermixed data and printer control commands that are fed as a data stream to the print command interpreter for further processing, thereby reducing the template to a set of intermixed data and printer commands that are fed as a date stream to the print command interpreter for further processing.

5. An analyzer, generator, and printer in accordance with claim 4 wherein the meta-language interpreter recognizes "if . . . end if" types of commands and responds to them by sending to the print command interpreter subsets of printer control commands from a template combined with incoming data and selected in accordance with the results of tests defined by the "" if . . . endif" types of commands and performed upon the incoming data.

6. An analyzer, generator, and printer in accordance with claim 4 wherein the meta-language interpreter recognizes "if . . . else . . . end if" types of commands and responds to them by sending to the print command interpreter subsets of printer control commands from a template combined with incoming data and selected in accordance with the results of tests defined by the "" if . . . else . . . end if" types of commands and performed upon the incoming data.

7. An analyzer, generator, and printer in accordance with claim 4 wherein the meta-language interpreter recognizes "if . . . elseif . . . else . . . end if" types of commands and responds to them by sending to the print command interpreter subsets of printer control commands from a template combined with incoming data and selected in accordance with the results of tests defined by the "" if . . . elseif . . . else . . . end if" types of commands and performed upon the incoming data.

8. An analyzer, generator, and printer in accordance with claim 4 wherein the meta-language interpreter recognizes "for . . . next" types of commands and responds to them that can generate multiple copies of subsets of printer control commands from a template combined with incoming data in accordance with tests performed upon the incoming data corresponding to said template.

9. An analyzer, generator, and printer in accordance with claim 4 wherein the meta-language interpreter recognizes "if . . . end if" types of commands that can select subsets of printer control commands and data from a template in accordance with tests performed upon the incoming data corresponding to said template.

10. An analyzer, report generator, and printer in accordance with claim 1 wherein the meta-language interpreter is able to parse embedded printer control commands found in the incoming data and of stripping such commands from the incoming data.

11. An analyzer, report generator, and printer in accordance with claim 1 wherein the meta-language interpreter is able to parse and recognize and respond to page ending commands embedded within the incoming data.

12. An analyzer, report generator, and printer in accordance with claim 1 wherein the correspondence between at least some templates and at least some of the incoming data is established by a trigger specification in the at least some templates which the meta-command interpreter detects within the incoming data.

13. An analyzer, report generator, and printer in accordance with claim 12 wherein templates containing a trigger specification may also contain a "start form" type of command, detectable by the meta-command interpreter, which causes subsequent incoming data to be processed by the meta-command interpreter under the control of a template designated by the "start form" type of command.

14. An analyzer, report generator, and printer in accordance with claim 13 wherein templates designated by a "start form" type of command may contain an "end form" type of command which, when encountered by the meta-command interpreter, causes it to revert to its normal mode of operation where template interpretation is triggered by triggers in the incoming data.

* * * * *